United States Patent [19]
Ohmae et al.

[11] Patent Number: 5,610,735
[45] Date of Patent: Mar. 11, 1997

[54] LIGHT SCATTERING LIGHT VALVE PROJECTION APPARATUS

[75] Inventors: Hideki Ohmae, Suita; Hiroshi Takahara, Neyagawa, both of Japan

[73] Assignee: Matsushita Electric Industrial Co., Ltd., Kadoma, Japan

[21] Appl. No.: 249,623

[22] Filed: May 26, 1994

[30] Foreign Application Priority Data

Jun. 4, 1993 [JP] Japan ................................. 5-134409

[51] Int. Cl.⁶ .................... G02F 1/1335; G02F 1/1333
[52] U.S. Cl. ................................. 349/10; 349/86
[58] Field of Search ..................... 359/40, 51, 41

[56] References Cited

U.S. PATENT DOCUMENTS

| | | | |
|---|---|---|---|
| 4,864,390 | 9/1989 | McKechnie et al. | 358/60 |
| 4,894,724 | 1/1990 | Wlkowsky | 358/231 |
| 4,995,702 | 2/1991 | Aruga | 359/40 |
| 5,231,432 | 7/1993 | Glenn | 359/40 |
| 5,274,480 | 12/1993 | Hirai et al. | 359/51 |
| 5,299,289 | 3/1994 | Omae et al. | 359/95 |
| 5,546,202 | 8/1996 | Ansley | 359/41 |

FOREIGN PATENT DOCUMENTS

| | | | |
|---|---|---|---|
| 1-241520 | 9/1989 | Japan | 359/51 |
| 1-255832 | 10/1989 | Japan | 359/51 |

OTHER PUBLICATIONS

Kichiji Tsuzuki, Projection Type Display Device, Japanese Publication No. 4–147290, dated May 20, 1992.

Nobuo Minoura, Projection Type Liquid Crystal Display Device, Japanese Publication No. 4–194921, dated Jul. 14, 1992.

Junichi Nakamura, Projection Type Liquid Crystal Display Devie, Japanese Publication No. 4–240979, dated Aug. 28, 1992.

Primary Examiner—William L. Sikes
Assistant Examiner—Charles Miller
Attorney, Agent, or Firm—Fish & Richardson, P.C.

[57] ABSTRACT

A light valve projection apparatus includes a light source, a light valve used for forming optical images in response to a change in light scattering conditions in the light valve of light irradiated from the light source, a projection lens for projecting the optical images on a screen, and a shield for shielding the optical images formed at or near a pupil of the projection lens. If the brightness of light exiting from the light valve, which is in a light scattering state, in a direction tilted by $\theta$ degrees from a normal dissection of the light valve is assumed to be half as bright as the light outgoing in the normal direction at $\theta_{1/2}$, $\theta_{1/2}$ of the light valve is less than 23°. The light valve may be a polymer dispersion liquid crystal display panel. When the polymer dispersion liquid crystal display panel is in a transparent state, light transmitted through the liquid crystal display panel is shielded by the shield, thus showing a black display on a screen. When the polymer dispersion liquid crystal display panel is in a light scattering state, light is scattered by the panel so that images formed in the panel are enlarged and projected by way of the projection lens onto the screen, thereby showing a bright white display.

25 Claims, 20 Drawing Sheets

LIGHT SCATTERING LIGHT VALVE PROJECTION APPARATUS

FIELD OF THE INVENTION

The invention relates to light valve projection apparatus for enlarging and projecting optical images onto screens which are formed and displayed in response to changes in light scattering conditions in light valves.

BACKGROUND OF THE INVENTION

Large screen displays have recently become of interest for the purpose of showing movies at home, presentations, and the like. Therefore, many types of projection apparatus using light valves have been proposed; among these apparatus, a liquid crystal projection apparatus has recently been commercialized which displays images on a large screen by enlarging and projecting images displayed in a miniaturized liquid crystal display panel by a projection lens or the like.

Liquid crystal display panels electrically convert the optical conditions of the panels to display images; there are different types of operation principles for the liquid crystal display panels. For example, a twisted nematic (TN) liquid crystal display panel used for presently commercialized liquid crystal projection apparatus utilizes the rotatory polarization of liquid crystals which is caused by the application of an electric field to the panel. However, in order to modulate light, the TN liquid crystal display panel requires polarizers for the incident surface as well as the output surface (surface of outgoing radiation) of the panel, so that the panel has poor efficiency in utilizing light.

On the contrary, liquid crystal display panels which form optical images in response to a change in light scattering conditions in the panels do not require a polarizer. Phase change (PC) liquid crystal display panels, dynamic scattering mode (DSM) liquid crystal display panels, polymer dispersion liquid crystal display panels, and the like are examples of these liquid crystal display panels. Among these panels, polymer dispersion liquid crystal display panels of the type disclosed in U.S. Pat. No. 4,435,047 have been enthusiastically researched in expectation of an improvement in brightness. Polymer dispersion liquid crystal display panels have advantages in not requiring a polarizer and an orientation treatment.

In liquid crystal display panels using polarizers, the light absorbed at the polarizers is mostly converted into heat. Therefore, it is difficult for these liquid crystal display panels to display images with intense brightness by increasing the power of the light source. In addition, since the polarizers and the liquid crystal display panels are heated to a high temperature by absorbed light, radiated heat and the like, the properties of the polarizers and panels are degraded after a short period.

Coating of the alignment layer and a rubbing treatment are required for manufacturing the TN liquid crystal display panel. The rubbing treatment not only adds to manufacturing time and labor but can tear the thin-film transistors (TFT) on the panel by static electricity, which results in lowering yield and increasing the manufacturing cost of the panel. Moreover, as the number of picture elements of a liquid crystal display panel used for a liquid crystal projection type television increases to more than 300,000, the size of each picture element becomes minute. When the number of picture elements in the TN liquid crystal display panel increases, more signaling wires and TFTs having uneven surfaces are provided to the picture elements. As a result, the surface of the TN liquid crystal display panel becomes uneven, and it is therefore difficult to carry out the rubbing treatment on the TN liquid crystal display panel.

Considering the dispersing conditions of liquid crystals in polymer, there are roughly two types of polymer dispersion liquid crystals. Drops of liquid crystals dispersed irregularly in polymer is one of these types, called polymer dispersion liquid crystals (PDLC). Another type of polymer dispersion liquid crystals is called polymer network liquid crystal (PNLC): a network of polymer is spread out in a liquid crystal layer as if liquid crystals are regularly absorbed in a sponge. Liquid crystal display panels including these types of polymer dispersion liquid crystals display images by controlling the scattering and transmitting conditions of light in the panels.

Thermoplastic resins or thermosetting resins may be used as polymers to disperse PDLC as long as they are transparent. Among these resins, moreover, it is most preferable to use a resin of an ultra-violet curing type as the polymer, since a conventional method of manufacturing a TN mode liquid crystal display panel can be directly applied. The conventional method comprises the steps of setting two substrates formed with electrodes by a spacer to maintain the gap between them and to have the electrodes face each other, fixing the substrates with epoxy resin (sealing material) to form a vacant cell, and injecting liquid crystals dispersed in a resin (liquid crystal solution) into the vacant cell.

When this conventional method is applied to manufacture a polymer dispersion liquid crystal display panel, an ultraviolet curing type acrylic resin is particularly useful as the resin in which to disperse liquid crystals. For example, when the resin is blended with liquid crystals to prepare a liquid crystal solution, the solution has enough fluidity to be injected at room temperature. After irradiating the injected liquid crystal solution with light, the resin is cured, phase-separating the liquid crystals. As a result, a polymer dispersion liquid crystal layer is formed.

The operation of dispersing liquid crystals in a polymer is explained by referring to FIGS. 20 (a) and 20 (b). In these figures, 201 is an array substrate; 202 is a picture element electrode; 203 is a counter electrode; 204 is a drop of liquid crystals; 205 indicates a polymer; and 206 is a counter electrode. A TFT is connected to picture element electrode 202 (not shown in FIGS. 20 (a) and 20 (b)). The drops of liquid crystals 204 are oriented irregularly as shown in FIG. 20 (a) when the TFT is off and voltage is not applied to picture element electrode 202. As a result, the refractive index of the drop of liquid crystals 204 becomes different from the refractive index of polymer 205 so that irradiated light is scattered. FIG. 20 (b), on the other hand, shows a polymer dispersion liquid crystal panel when a TFT is on and voltage is applied to picture element electrode 202. As shown in FIG. 20 (b), the liquid crystals are oriented in one direction. If the refractive index of the liquid crystals after the orientation is the same as the refractive index of the polymer, irradiated light transmits through array substrate 201 without being scattered. When the liquid crystals are in a drop condition as PDLC, the diameter of a drop is called an average particle diameter. The average diameter of a PNLC, on the other hand, is called an average pore.

FIG. 21 shows an example of a conventional liquid crystal projection apparatus using a polymer dispersion liquid crystal display panel. Light emerging from a lamp 211 is focused by a concave reflector 212, and enters a liquid crystal display panel 213. If the light is not modulated in liquid crystal display panel 213, all of the light then enters a projection lens 214. Liquid crystal display panel 213 is a polymer dispersion liquid crystal display panel, in which a liquid crystal layer 218 is sandwiched between glass substrates 216 and 217. On the inner surfaces of glass substrates 216 and 217, picture element electrodes in a matrix condition are applied.

The scattering conditions of light vary in response to image signals applied to the liquid crystal display panel, so that optical images are formed in liquid crystal display panel 213 due to a change in the light scattering conditions. When voltage is applied to a picture element, light emerging from the light source transmits through the liquid crystal display panel and is projected by way of projection lens 214 onto screen 219. Thus, a bright optical image is displayed on screen 219. Light from the light source is scattered by the liquid crystal display panel if voltage is not applied to the picture element. The scattered light neither enters projection lens 214 nor reaches screen 219, thus displaying a dark optical image on screen 219. Optical images formed by liquid crystal display panel 213 in response to changes in light scattering conditions are enlarged and projected by way of the projection lens to screen 219. The collection angle of light going out from liquid crystal display panel 213 and entering the projection lens is determined by the pupil diameter of projection lens 214.

The quantity of light within a fixed solid angle of light outgoing from a liquid crystal display panel is influenced by the light scattering conditions of the liquid crystal display panel. For example, as the light scattering increases, the quantity of light within a fixed solid angle decreases. A conventional liquid crystal projection apparatus having an aperture inside the projection lens can provide a bright projection image on a screen; and its composition is simple. However, this conventional liquid crystal projection apparatus has a poor contrast ratio between the brightness of a white display and the brightness of a black display. As one solution to this problem, the collection angle of the projection lens is minimized when the apparatus shows a black display on a screen with a liquid crystal display panel in a light scattering state. As a result, the quantity of scattered light transmitting through the projection lens and reaching a screen decreases, and the brightness of the black display declines. As a result of this decrease in the brightness of the black display, the contrast raio increases. As another solution, light may be scattered more intensely by the liquid crystal display panel to decrease the quantity of light within a solid angle of light going out from the panel as well as the quantity of scattered light transmitting through the projection lens, thus reducing the brightness of the black display on the screen and improving the contrast ratio.

When light is completely scattered by a liquid crystal display panel, the contrast ratio (CR) is calculated from the formula, $1/\sin^2 \sigma$, wherein $\sigma$ is the half of a collection angle (half angle) of the projection lens. (See Dewey.; Proc. of SID.; p. 138; 1977.) The most preferable contrast ratio of a direct vision type apparatus having an aperture in the projection lens is more than 30:1, while the most preferable contrast ratio of a projection type apparatus having an aperture in the projection lens is more than 100:1.

It is necessary to intensify the light scattering conditions of a liquid crystal display panel in an apparatus having an aperture in the projection lens so that the contrast ratio is increased. When a polymer dispersion liquid crystal display panel is used as a light valve, it is required that the panel functions with a low driving voltage and has high light scattering properties. By increasing the thickness of the polymer dispersion liquid crystal layer in the panel, the light scattering properties will improve. However, the driving voltage is also required to be high, so that driving the TFT of the polymer dispersion liquid crystal panel becomes difficult.

Especially when the apparatus is a projection type apparatus, the F number of a projection optical system adjusted to a light source including a metal halide lamp and a concave reflector is from 4 to 5. Thus, even if a polymer dispersion liquid crystal display panel in a complete light scattering state is used for the projection type apparatus, its contrast ratio is only on the order of 90:1.

SUMMARY OF THE INVENTION

In order to solve the problems of conventional apparatus, this invention provides light valve projection apparatus which form optical images by changing light scattering conditions in the liquid crystal display panels, thus improving the contrast of projected images.

The invention provides a light valve projection apparatus comprising a light source, a light valve for forming optical images in response to a change in light scattering conditions in the light valve of light radiated from the light source, a projection lens for projecting the optical images on a screen, and a shield for shielding the optical images formed at or near the pupil of the projection lens.

Suppose at $\theta_{1/2}$, the brightness of light going out from the light valve, which is in a light scattering state, in a direction tilted by $\theta$ degree with respect to a normal direction of the light valve is half as bright as the light outgoing in the normal direction. See P. Jones, et al., "Performance of NCAP Projection Displays", SPIE, vol. 1456, p. 6–14 (1991). The light valve of this light valve projection apparatus has light scattering properties satisfying the condition of $\theta_{1/2}<23°$. It is preferable that the spread angle ($\theta_1$) of light radiated to this light valve is less than 9°.

It is preferable that the light valve is a polymer dispersion liquid crystal display panel having a liquid crystal layer in which liquid crystals are dispersed in a matrix polymer.

The invention also provides a light valve projection apparatus comprising a light source, light valves for forming optical images in response to a change in light scattering conditions in the light valves of light radiated from the light source, a projection lens for combining and then projecting the optical images on a screen, and a shield for shielding the optical images formed at or near a pupil of the projection lens. The light scattering properties of thence light valves satisfy the condition of $\theta_{1/2}<17°$. It is preferable that the spread angle ($\theta_1$) of light radiated to the light valves is less than 6°.

It is also preferable that light radiated from the light source is split into three color channels, such as blue, green and red by a color filter, and that the light valve is placed to receive at least one of the blue, green and red channels.

It is further preferable that the filter is a dichroic prism.

It is preferable that the light valves are polymer dispersion liquid crystal display panels having a liquid crystal layer in which liquid crystals are dispersed in a matrix polymer.

It is also preferable that the liquid crystal layer in at least one liquid crystal display panel has a thickness different from the thickness of the liquid crystal layer of other liquid crystal display panels.

It is further preferable that the liquid crystals contained in at least one liquid crystal display panel have an average particle diameter different from the average particle diameter of the liquid crystals in other liquid crystal display panels.

The invention provides another light valve projection apparatus comprising a light source, a light valve for forming optical images in response to a change in light scattering conditions in the light valve of light radiated from the light source, a projection lens for projecting the optical images on a screen, a first mask located between the light source and the light valve, a second mask located between the light valve and the projection lens, and a schlieren lens located between the first and the second masks. Images formed at the first mask are projected on the second mask by way of the schlieren lens, and images formed at the apertures of the first mask are shielded by the second mask. The light valve of this light valve projection apparatus has light scattering properties satisfying the condition of $\theta_{1/2}<23°$. It is preferable that a fly-eye lens is positioned between the light source and the first mask, and that a field lens array is disposed near the first mask.

It is also preferable that the light valve is a polymer dispersion liquid crystal display panel having a liquid crystal layer in which liquid crystals are dispersed in a matrix polymer.

The invention also provides a light valve projection apparatus comprising a light source, light valves for forming optical images in response to a change in light scattering conditions in the light valves of light radiated from the light source, a projection lens for combining and then projecting the optical images on a screen, a first mask located between the light source and the light valves, a second mask located between the light valves and the projection lens, and a schlieren lens located between the first mask and the second mask. Images formed at the first mask are projected on the second mask by way of the schlieren lens, and images formed at the apertures of the first mask are shielded by the second mask. The light valves of this light valve projection apparatus have light scattering properties satisfying the condition of $\theta_{1/2}<17°$.

It is preferable that a fly-eye lens is positioned between the light source and the first mask, and that a field lens array is disposed near the first mask.

It is also preferable that light radiated from the light source is split into three color channels such as blue, green and red by color filters, and that the light valve is placed to receive at least one of the blue, green and red channels.

It is preferable that the color filter is a dichroic prism.

It is preferable that the light valves are polymer dispersion liquid crystal display panels having a liquid crystal layer in which liquid crystals are dispersed in a matrix polymer.

It is also preferable that the liquid crystal layer of at least one liquid crystal display panel has a thickness different from the thickness of the liquid crystal layers of other liquid crystal display panels.

It is further preferable that the liquid crystals contained in at least one liquid crystal display panel have an average particle diameter different from the average particle diameter of liquid crystals in other liquid crystal display panels.

The projection apparatus of the invention comprises at least one shield. Thus, when the light valve of the projection apparatus is in a light scattering state, a white display is shown on the screen. On the contrary, all of the light is shielded by the shield and a black display is shown on the screen when the light valve is in a transparent state.

The light scattering characteristics of the light valve influence the brightness and contrast ratio of image displays. For example, a bright white display as well as image displays with clear contrasts are obtained if the scatter half angle ($\theta_{1/2}$) of the light valve is less than 23°. It is not necessary to improve the light scattering characteristic of the liquid crystal layer of a projection apparatus of the invention as long as a polymer dispersion liquid crystal display panel is used as the light valve. Thus, the thickness of the panel can be kept thin, and the driving voltage can also be low.

BRIEF DESCRIPTION OF THE DRAWINGS

FIG. 20 (b) shows a cross-sectional view of a polymer dispersion liquid crystal display panel when a voltage is applied to the picture element electrode.

DETAILED DESCRIPTION OF THE INVENTION

Figure 11:
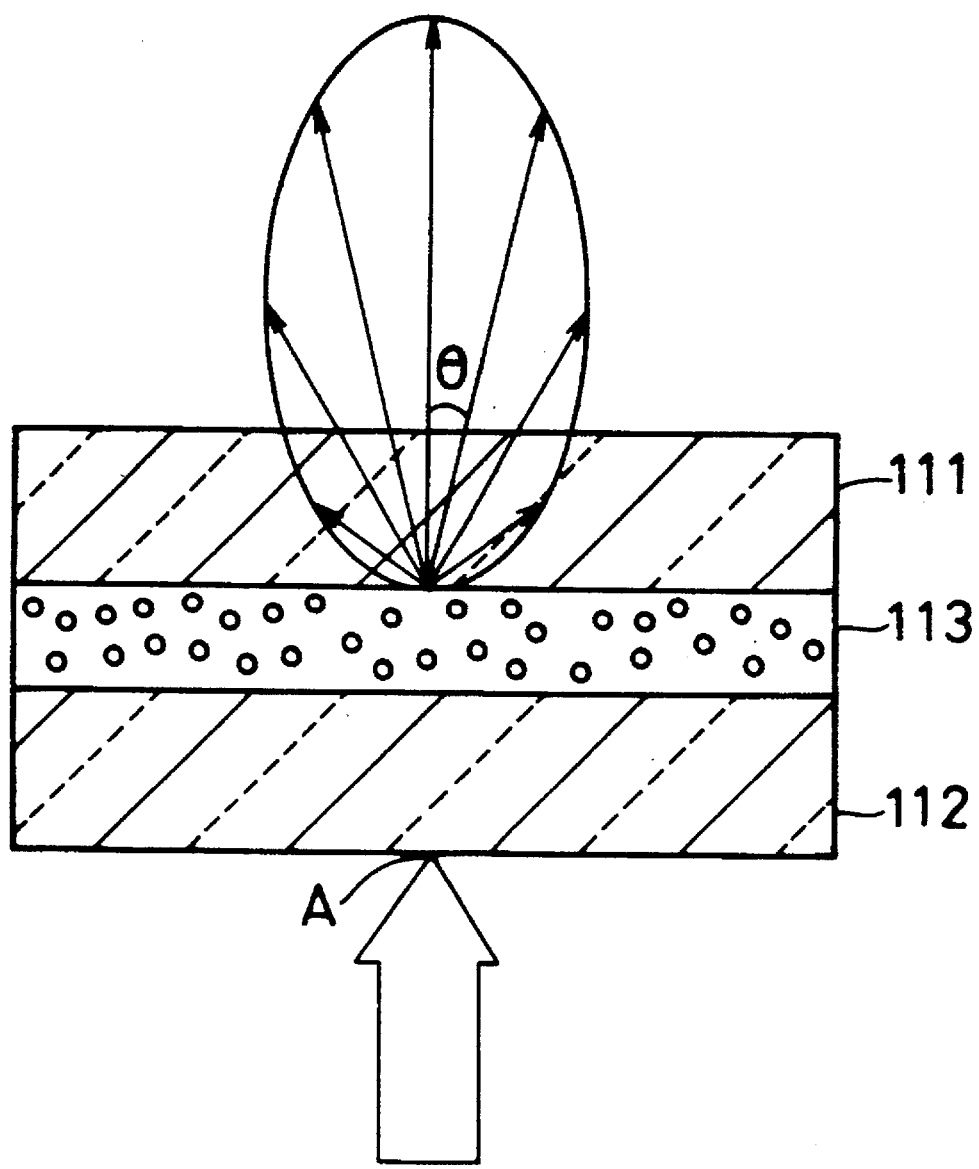
FIG. 11 is a cross-sectional view of a polymer dispersion liquid crystal panel, showing its light scattering characteristic.

The light scattering characteristic of a polymer dispersion liquid crystal display panel is explained by referring to FIG. 11. In FIG. 11, a polymer dispersion liquid crystal layer 113 is sandwiched between transparent substrates 111 and 112. When a voltage is not applied to polymer dispersion liquid crystal layer 113, light is scattered by the liquid crystal layer.

As shown in FIG. 11, parallel rays are irradiated on the outside surface of transparent substrate 112 with point A as the central point of the irradiation range. The illuminance on the outside surface by the parallel rays is E; the output angle of the scattered light outgoing from polymer dispersion liquid crystal layer 113 (angle of tilt with respect to the normal direction of the liquid crystal layer) is $\theta$; the brightness of the scattered light in a direction tilted by $\theta$ with respect to the normal direction is $B(\theta)$. Brightness (B) is expressed by the following Formula (1).

$B(\theta)=GE/\pi$  Formula (1)

Figure 12:
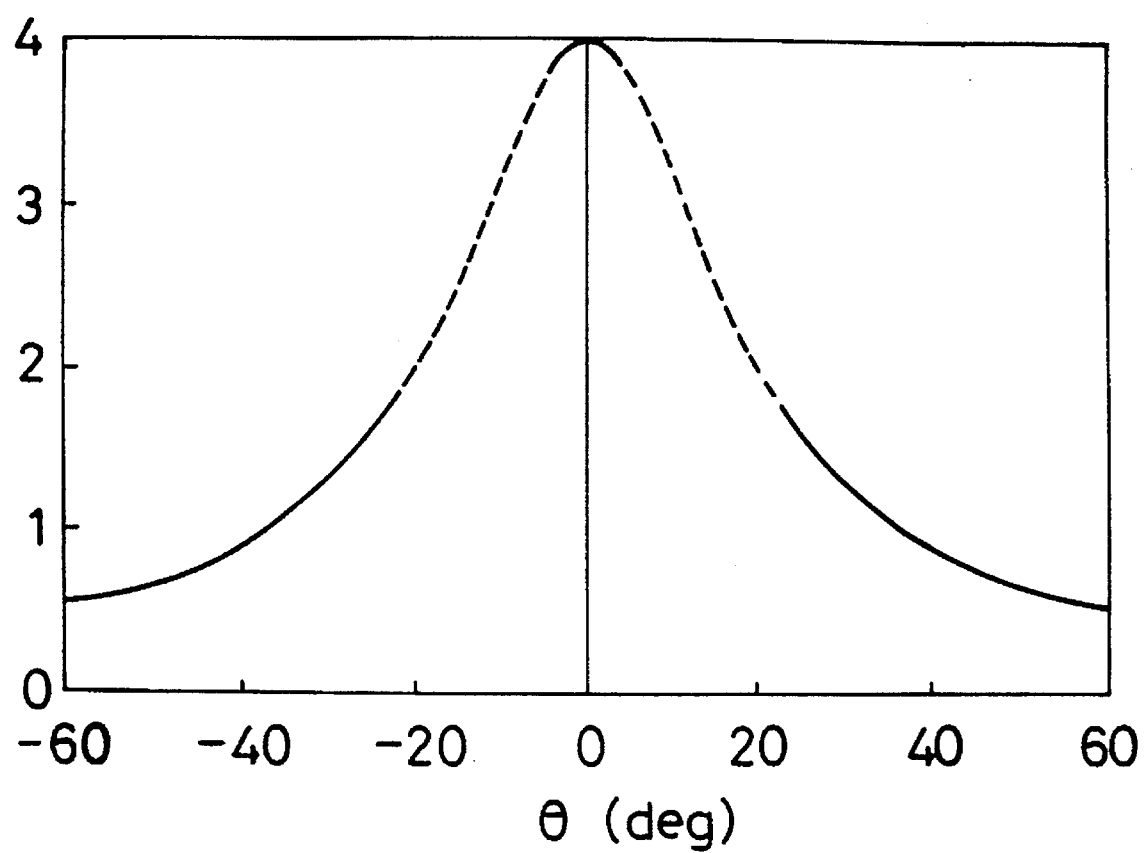
FIG. 12 is a graph showing scattering gains of a polymer dispersion liquid crystal display panel.

G in Formula (1) is denoted as "scattering gain" in the context of this invention. The smaller the scattering gain (G), the higher is the light scattering characteristic of the polymer dispersion liquid crystal display panel. For example, FIG. 12 is a graph showing the correlation between G and $\theta$ of a liquid crystal display panel. According to Formula (1), it is clear that the shape of a graph showing the correlation between $B(\theta)$ and $\theta$ would be the same as the graph shown in FIG. 12 even though the values in these graphs are different from each other.

An angle with half the brightness of the brightness at $\theta=0°$ is defined as a scatter half angle ($\theta_{1/2}$), which is an indicator of the light scattering characteristics of a liquid crystal display panel in the invention. The scatter half angle of the liquid crystal display panel of FIG. 12 is 20°. In general, the larger the scatter half angle ($\theta_{1/2}$) is, the higher the light scattering characteristic becomes.

If an area is identified as S, the luminous intensity in a direction tilted by $\theta$ with respect to the normal direction ($I(\theta)$) is expressed by the following formula:

$I(\theta)=B(\theta) S \cos \theta$.

Figure 13:
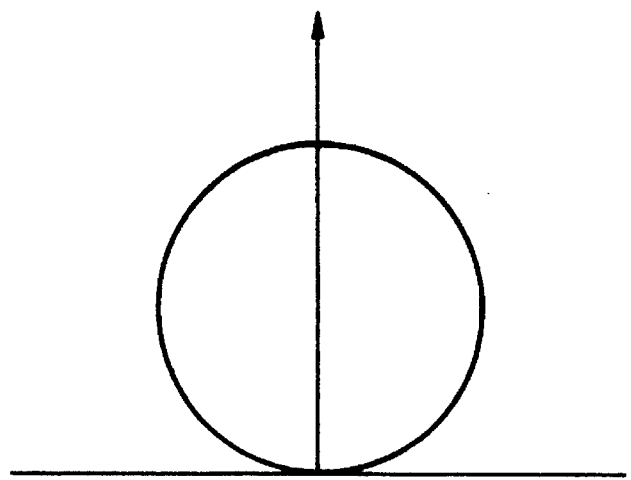
FIG. 13 shows the luminous intensity distribution characteristic of a polymer dispersion liquid crystal display panel in a complete light scattering state.
Figure 14:
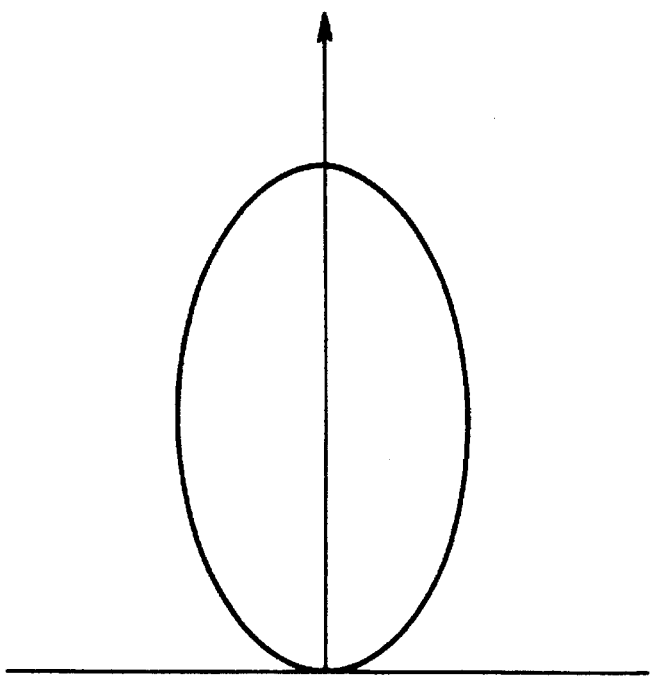
FIG. 14 shows the luminous intensity distribution characteristic of a polymer dispersion liquid crystal display panel having the light scattering characteristic shown in FIG. 11.

The locus of the vector of luminous intensity ($I(\theta)$) from 0° ($\theta$) to 90° ($\theta$) is called the luminous intensity distribution characteristic. A two-dimensional luminous intensity distribution characteristic; of perfectly scattered light is shown in FIG. 13. When irradiated light is completely scattered, B ($\theta$) remains the same with a different $\theta$. Therefore, in two dimensions, the luminous intensity distribution characteristic is expressed as a circle as shown in FIG. 13. When a liquid crystal display panel has the light scattering characteristic of FIG. 12, the luminous intensity distribution characteristic is expressed as an ellipse in two dimensions as in FIG. 14. This ellipse is expressed by the following Formula (2).

$x^2+ky^2=1$  Formula (2)

As the coefficient (k) becomes small, the light scattering characteristic of the liquid crystal display panel is enlarged.

Luminous flux ($\Phi$) is also calculated by integrating the luminous intensity ($I(\theta)$) within a solid angle of a three-dimensional luminous intensity distribution characteristic. Suppose the solid angle is identified as W, W is then expressed by the following Formula (3).

$W=2\pi (1=\cos \theta)$  Formula (3)

The following Formula (4) is a differentiated Formula (3).

$dW=2\pi \sin \theta\, d\theta$  Formula (4)

Then, luminous flux ($\Phi$) is expressed as follows:

$$\Phi = \int I dW = \int_0^\theta 2\pi \sin\theta\, I d\theta.$$

In other words, luminous flux ($\Phi$) is calculated by integrating the circumferences of the three-dimensional luminous intensity distribution characteristic, and is the surface area of the three-dimensional luminous intensity distribution characteristic.

The light valve projection apparatus of the invention displays images in the following steps:
irradiating light onto a light valve from a light source;
forming optical images in the light valve in response to a change in light scattering conditions in the light valve; and
enlarging and projecting the optical images by way of a projection lens to a screen.

For the purpose of the following explanation it is assumed that a polymer dispersion liquid crystal display panel is the light valve. When a voltage is applied to the polymer dispersion liquid crystal display panel, the panel becomes transparent (light transmitting state or transmissive state). As a result, light emerging from a light source enters the light valve, and is then shielded by a shield in the projection lens, thus showing a black display on the screen. When voltage is not applied to the polymer dispersion liquid crystal display panel, the panel becomes opaque (light scattering state). Light emerging from a light source is scattered by the light valve in a light scattering state, and only the light within the range of an angle equal to an F number of the projection lens is collected by the projection lens, thus showing a white display on the screen. The light shielded by the shield does not reach the screen.

If the collection angle (half angle) of a projection lens is $\theta$, then the F number of the projection lens is expressed as follows:

$F=1/(2 \sin \theta)$.

When the light valve is thoroughly transparent, light going out from the light valve is completely shielded by the shield. Hence, a black display is shown on the screen, and the contrast ratio of the projected image is infinite. The collection ratio of a white display, on the other hand, is determined by the light scattering condition of the light valve, the collection angle of the projection lens, and the spread angle of the light source. When the collection ratio is less than 50%, the brightness of the light valve becomes the same as the brightness of a TN liquid crystal display panel using polarizers. As a result, the positive characteristic of the light valve in which a polarizer is not used is reduced.

Figure 17:
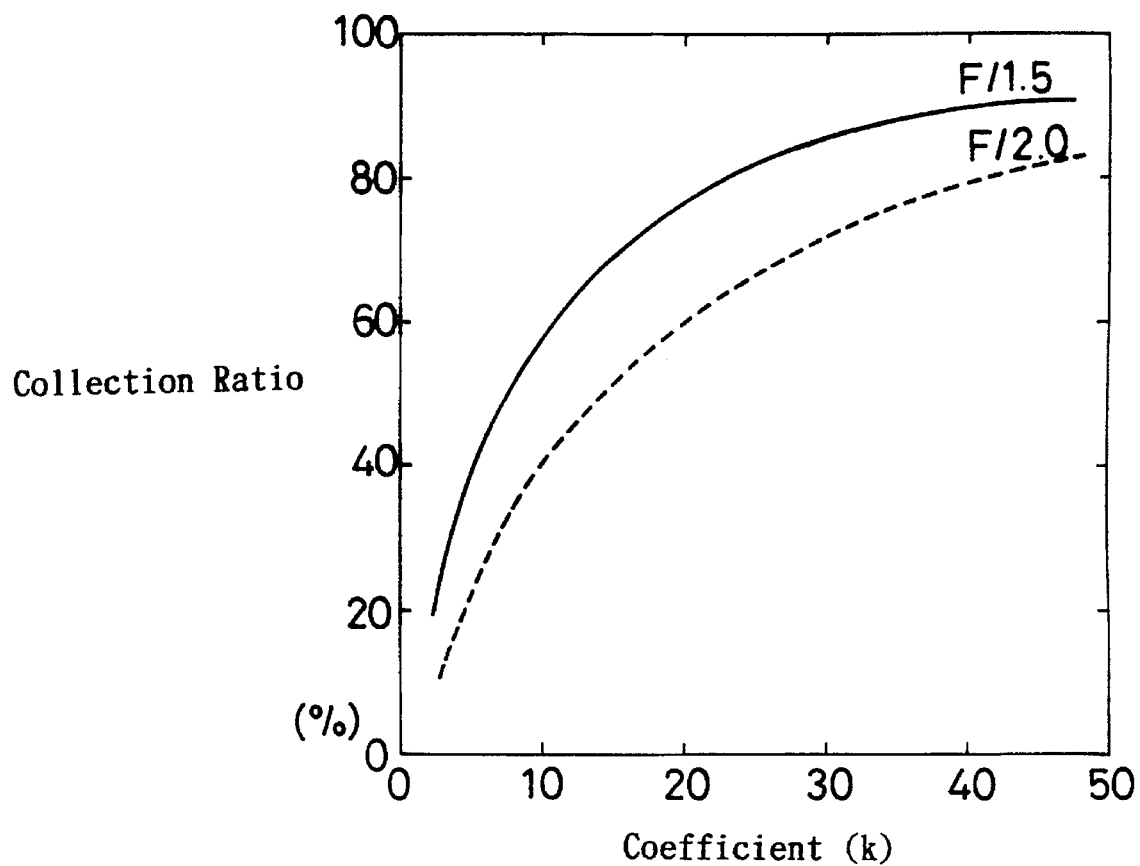
FIG. 17 is a graph showing the correlation between the collection ratios of a light valve projection apparatus and light scattering characteristic of the polymer liquid crystal display panel.

In reference to Formula (2), collection ratios are calculated by varying $\theta_1$ (collection angle of a projection lens) and $\theta_2$ (spread angle of a light source). FIG. 17 shows the correlation between collection ratios and the coefficient (k)

of an F1.5 projection lens and an F2 projection lens. The spread angles of these projection lenses are almost zero. It is unrealistic to have a projection lens with an F number smaller than 2 when one projection lens is used for more than one light valve. A projection lens with an F number smaller than 1.5 is also unrealistic if one projection lens is used for one light valve. According to FIG. 17, it is required that (k) of an F1.5 projection lens is more than 7 and that an F2 projection lens has (k) higher than 13, thus providing collection ratios more than 50%. In other words, the $\theta_{1/2}$ of an F1.5 projection lens is less than 23° while the $\theta_{1/2}$ of an F2 projection lens is less than 17°. More specifically, collection ratios are calculated by the following formula:

$$(\Phi_1-\Phi_2)/\Phi$$

wherein $\Phi$ represents the luminous flux of the entire scattered light, $\Phi_1$ represents the luminous flux within the collection angle of projection lens ($\theta_1$), and $\Phi_2$ represents the luminous flux within the spread angle of light source ($\theta_2$).

Figure 18:
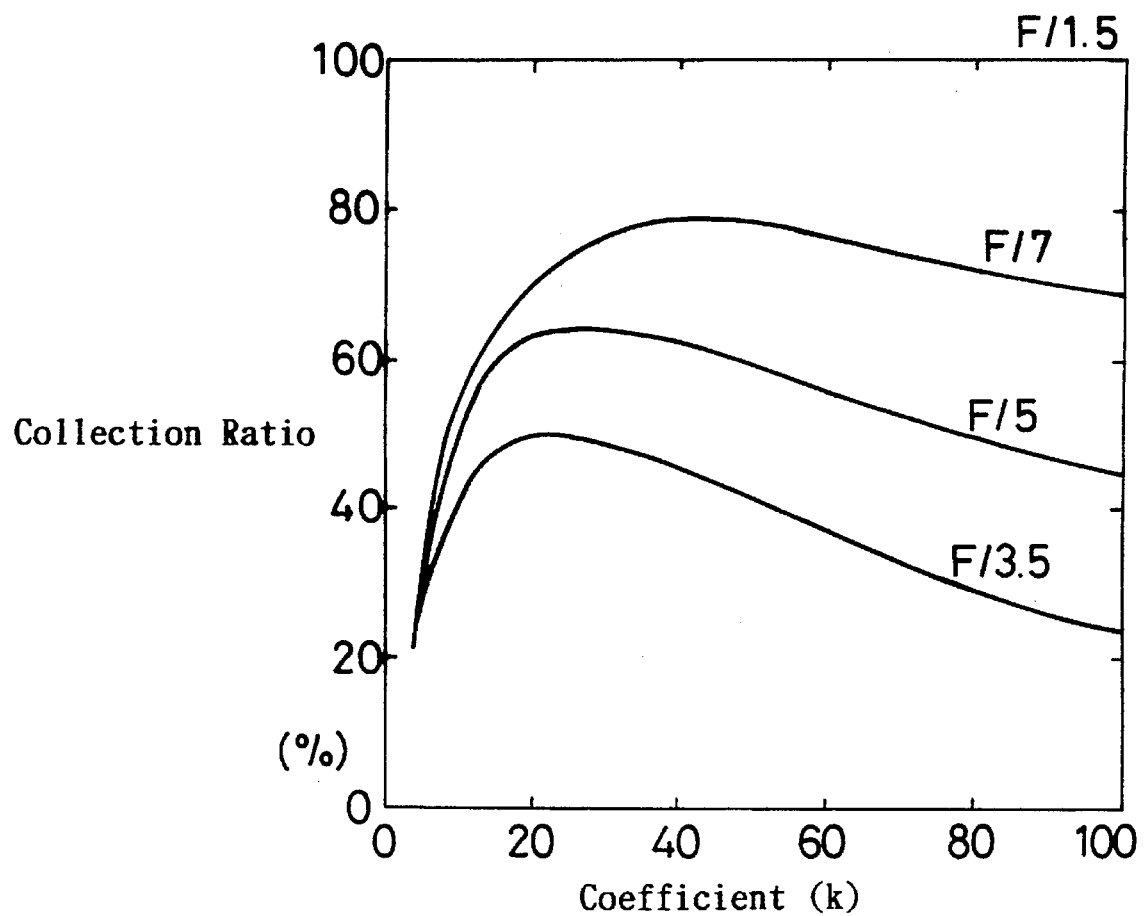
FIG. 18 is another graph showing the correlation between the collection ratios of a light valve projection apparatus and light scattering characteristic of the polymer liquid crystal display panel.

As shown in FIG. 18, if spread angle ($\theta_2$) is less than 9°, it is possible to achieve more than a 50% collection ratio with an F1.5 projection lens. According to FIG. 19, more than a 50% collection ratio for an F2 projection lens is possibly obtained when the spread angle is less than 6°.

Another example of a light valve apparatus of the invention comprises a fly-eye lens, thus forming many fractional optical images at the apertures of a first mask. As a result, the shielding of light by the first mask is minimized, utilizing the light more efficiently and reducing the spread angle of a light source. When the polymer dispersion liquid crystal display panel is in a light scattering state, the entire light going out from the first mask transmits through the light valve. After possing through a schlieren lens, the light is shielded by a second mask (shield) without reaching the screen, thus showing a preferable black display on the screen. When the polymer dispersion liquid crystal display panel is in a light scattering state, light transmitted through the first mask is scattered by the light valve. Then, the light within an angle equivalent to the F number of the optical system passes through the apertures of the second mask (shield), thus showing a white display on the screen.

In this invention, the light valve is not limited to a polymer dispersion liquid crystal display panel. Any panel which can form optical images by a change in light scattering conditions, such as PLZT (Lanthanum Doped Lead Zirconate Titanate: (Pb-La)(Zr-Ti)$O_3$), can also be used.

The invention is now specifically explained by referring to the following examples. The examples are illustrative and should not be construed as limiting the invention in any way.

Example 1

Figure 1:
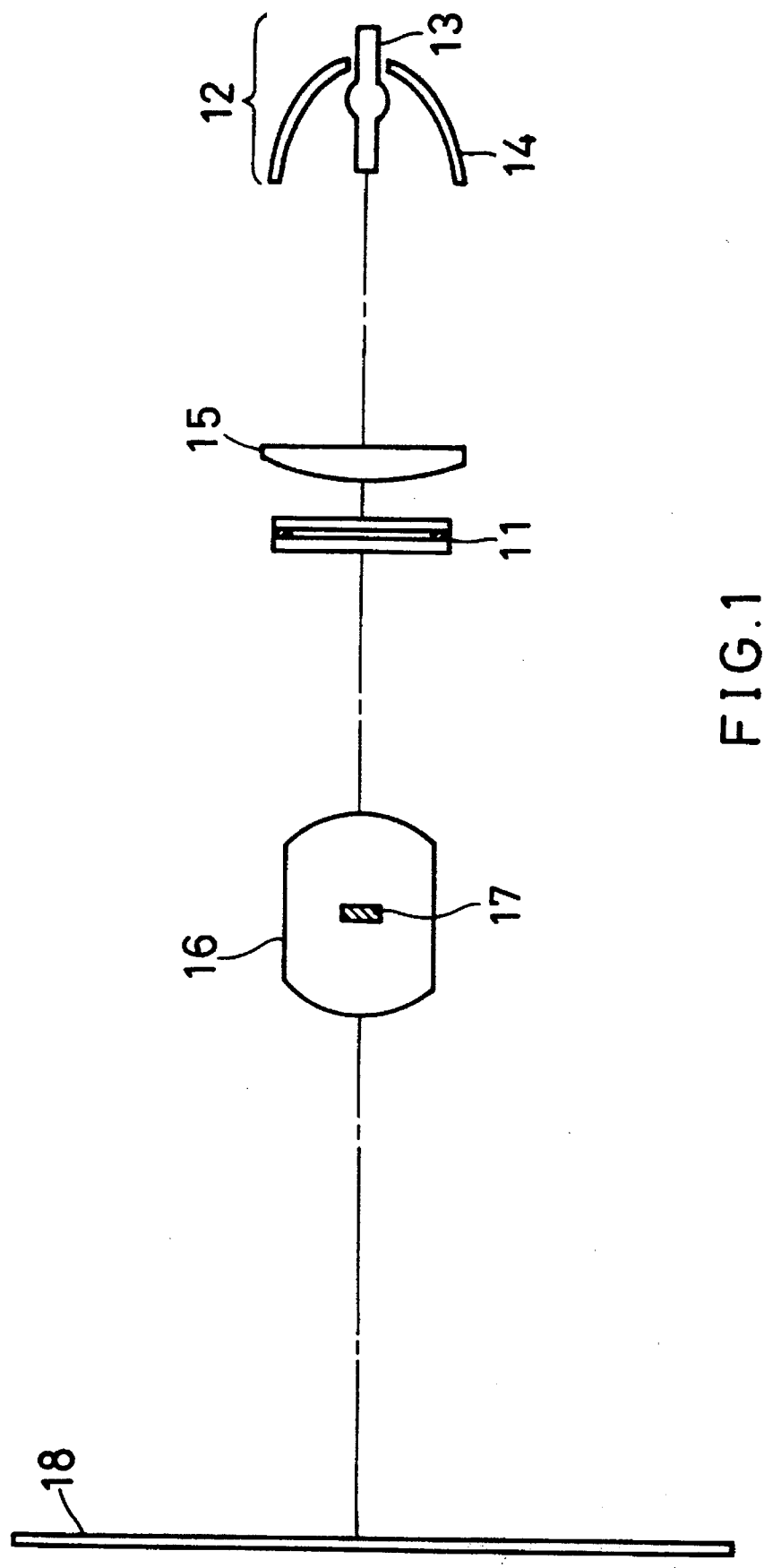
FIG. 1 is a diagram of a light valve projection apparatus of one embodiment of the invention.

In FIG. 1, 11 indicates a polymer dispersion liquid crystal display panel; 12 is a light source; 16 is a projection lens; 17 is a shield in the projection lens; and 18 is a screen.

Figure 2:
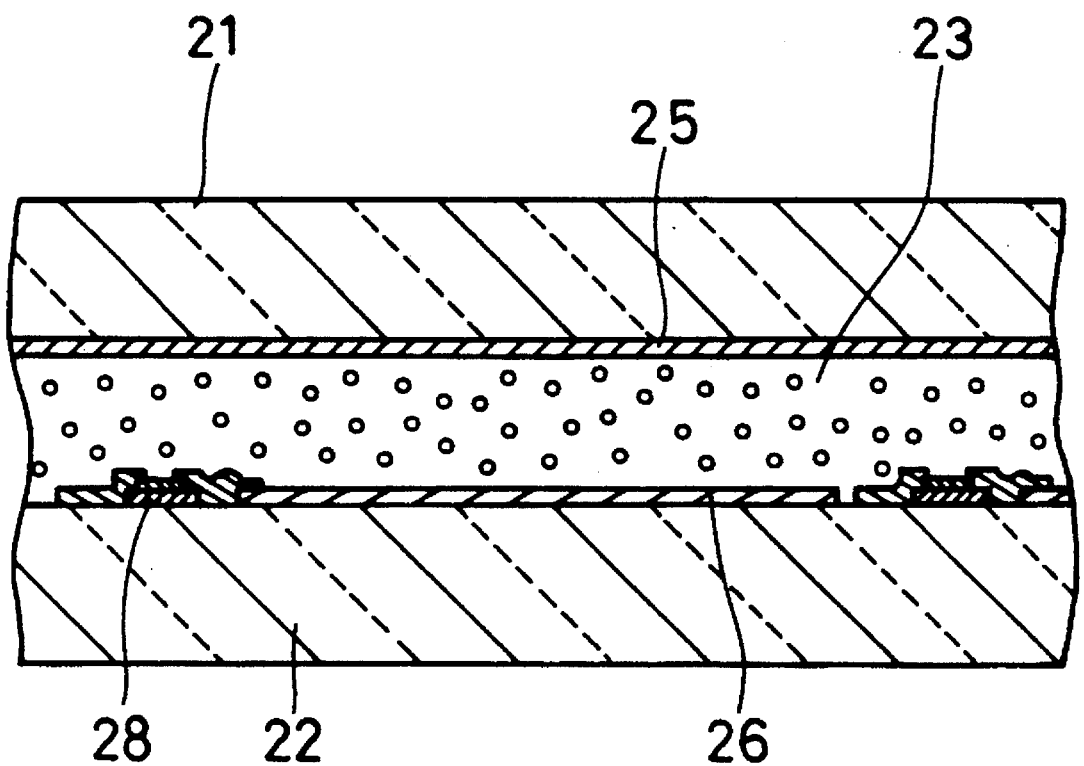
FIG. 2 is a cross-sectional view of a polymer dispersion liquid crystal display panel used for the light valve projection apparatus of the embodiment of FIG. 1.

FIG. 2 shows a cross-sectional view of liquid crystal display panel 11. A polymer dispersion liquid crystal layer 23 is sandwiched between transparent substrates 21 and 22. A counter electrode 25 and a picture element electrode 26 are formed on the inner surfaces of substrates 21 and 22 respectively. Picture element electrode 26 is formed in a matrix condition, and TFTs (thin-film transistors) 28 are applied close to the ends of the picture element electrode as switching elements. Each TFT 28 is connected to a source signal line (not shown in FIG. 2) and a gate signal line (not shown in the figure). The source signal line and the gate signal line are connected to a signal feed circuit and a scanning circuit, respectively. Thus, a signal voltage is supplied to each picture element. When a sufficient electric field is applied to polymer dispersion liquid crystal layer 23, irradiated light transmits straight through the liquid crystal layer. If an electric field is not applied to the liquid crystal layer, irradiated light is scattered by the liquid crystal layer. In other words, the application of voltage to the liquid crystal layer controls light scattering conditions in the layer.

Nematic liquid crystals, smectic liquid crystals, or cholesteric liquid crystals are preferably used as the liquid crystals in the liquid crystal display panel. The liquid crystals may consist of a single liquid crystal material or multiple kinds of liquid crystals, and may be mixed with other materials besides liquid crystals.

It is preferable to use a transparent polymer including a thermoplastic resin, a thermosetting resin, and a photosetting resin as the polymer matrix material. In consideration of simplicity in manufacturing processes, separation of the polymer from liquid crystals and the like, it is most preferable to use resins of the ultra-violet curing type in the invention. More specifically, ultra-violet curing type acrylic resins, preferably the resins containing an acryl monomer or an acryl oligomer which is polymerized and cured by an ultraviolet ray irradiation, are preferably used in the invention.

2-ethylhexylacrylate, 2-hydroxyethylacrylate, neopentyl glycol acrylate, hexanediol diacrylate, diethylene glycol diacrylate, polypropylene glycol diacrylate, poly(ethylene glycol) diacrylate, trimethylolpropane diacrylate, polyethylene glycol diacrylate, trimethylolpropane triacrylate, pentaerythritol acrylate, and the like are the examples of the acryl monomer.

As the examples of the acryl oligomer or prepolymer, polyester acrylate, epoxy acrylate, polyurethane acrylate, and the like are included.

In order to polymerize the resin smoothly, a polymerization initiator such as 2-hydroxy-2-methyl-1-phenylpropane-1-on (trademark: Darocure 1173 manufactured by Merck Co.), 1-(4-isopropylphenyl)-2-hydroxy-2-methylpropane-1-on (trademark: Darocure 1116 manufactured by Merck Co.), 1-hydroxycyclohexyl phenyl ketone (trademark: Irgacure 184 manufactured by Ciba-Geigy Co.) and benzyl methyl ketal (trademark: Irgacure 651 manufactured by Ciba-Geigy Co.) may be added to the resin. A chain transfer agent, a photosensitizer, a dye, a crosslinking agent or the like may also be used as optional components in the resin.

Most significantly, the refractive index ($n_o$) of the liquid crystals should be almost the same as the refractive index ($n_p$) of the polymer in a liquid crystal display panel when an electric field is applied to the panel, so that irradiated light is not scattered by the liquid crystal display panel during the application of an electric field to the panel.

Liquid crystal panel 11 of this example is prepared in the following steps:

setting substrate 22, which is formed with picture element electrode 26, TFTs 28, source signal lines, gate signal lines and the like as shown in FIG. 2, apart from substrate 21 with a spacer to maintain a 5 μm gap between them and to have the electrodes face each other;

injecting a mixed solution of 2-ethylhexylacrylate (20 parts), trimethylolpropane triacrylate (10 parts), oligomer (M-1200 manufactured by Toa Gosei Kagaku K. K.: 13 parts), polymerization initiator (Darocure-1173: 0.5 parts), and liquid crystals (E-7 manufactured by BDH Co.: 70 parts) into the gap; and irradiating the solution with 60 mW/$cm^2$ ultraviolet rays at 40° C., thus forming a polymer dispersion liquid crystal layer as well as liquid crystal display panel 11.

The illuminance on the incident surface of liquid crystal display panel 11 by the irradiation of parallel rays is E; the output angle of scattered light outgoing from the polymer dispersion liquid crystal layer (angle of tilt with respect to the normal direction of the liquid crystal layer) is θ; and the brightness of scattered light in a direction tilted by θ with respect to the normal direction is B(θ). Then, a light scattering characteristic of liquid crystal display panel 11 with no application of an electric field to the panel is expressed as follows:

$$G = \pi B/E \qquad \text{Formula (5)}$$

According to this formula, the characteristic is not dependent on the intensity of incident light. G in Formula (5) is identified as the scattering gain. The correlation between output angles (θ) and gains (G) of liquid crystal display panel 11 is expressed as the curve shown in FIG. 3. According to FIG. 3, gain (G) at 0° output angle (θ) is about 25, which is much smaller than the gain (G=0.5) obtained by a liquid crystal display panel in a complete light scattering state and with the highest light scattering characteristic. In other words, the light scattering characteristic of liquid crystal panel 11 is extremely low.

When a liquid crystal display panel having an aperture is used in an apparatus, the liquid crystal layer is required to be thicker than 20 μm and the driving voltage is kept high at 50 V to provide a complete light scattering state (G=0.5). The liquid crystal display panel of this example, on the contrary, needs a thin liquid crystal layer and a low driving voltage since its light scattering characteristic is required to be low.

Figure 4:
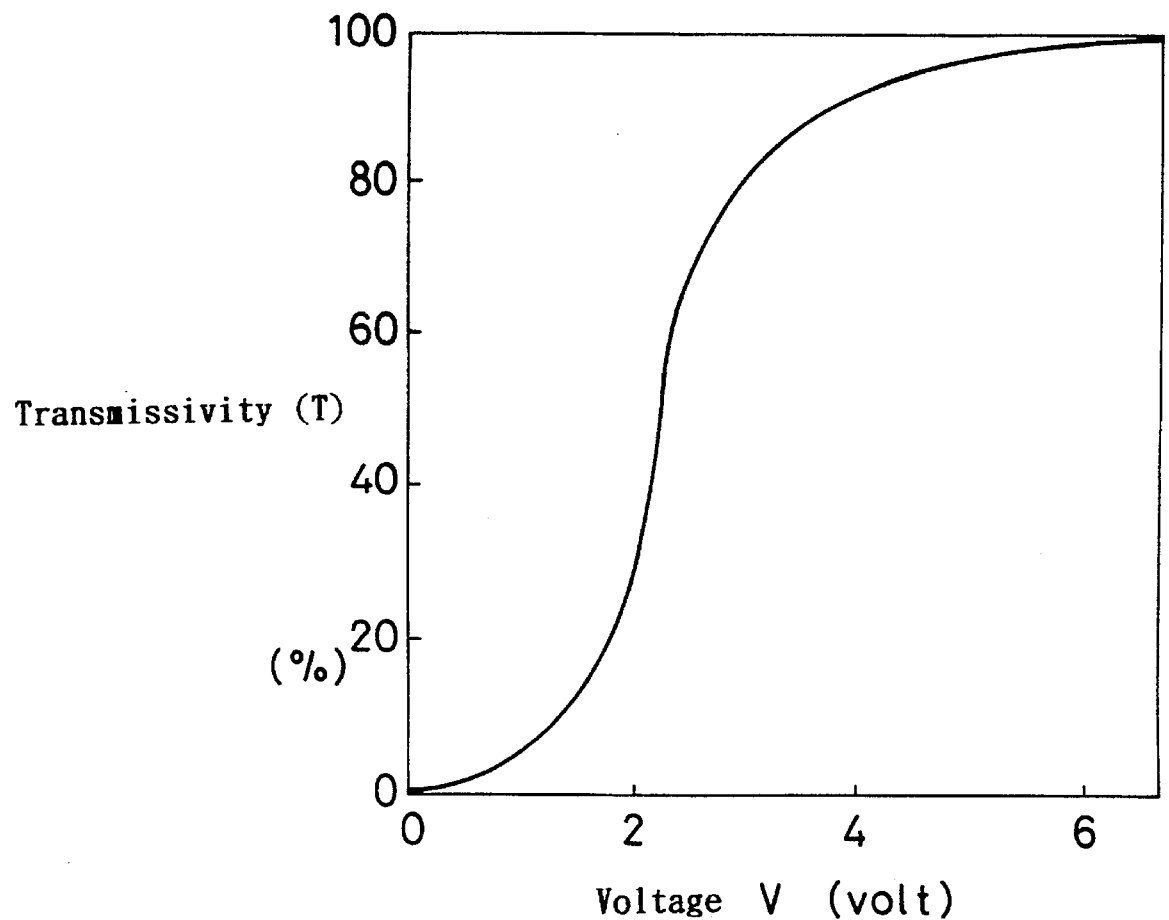
FIG. 4 is a graph showing the correlation between an applied voltage and the transmissivity of the polymer dispersion liquid crystal display panel of the embodiment of FIG. 1.

FIG. 4 shows the correlation between the transmissivity of polymer liquid crystal display panel 11 and applied voltage. According to the figure, when a sufficient level of electric field is applied to the liquid crystal display panel, the panel stays highly transparent without scattering the light entering the panel. By adding voltage to the liquid crystal display panel, the light scattering state in the panel can be arranged to satisfy the conditions of this invention.

Figure 3:
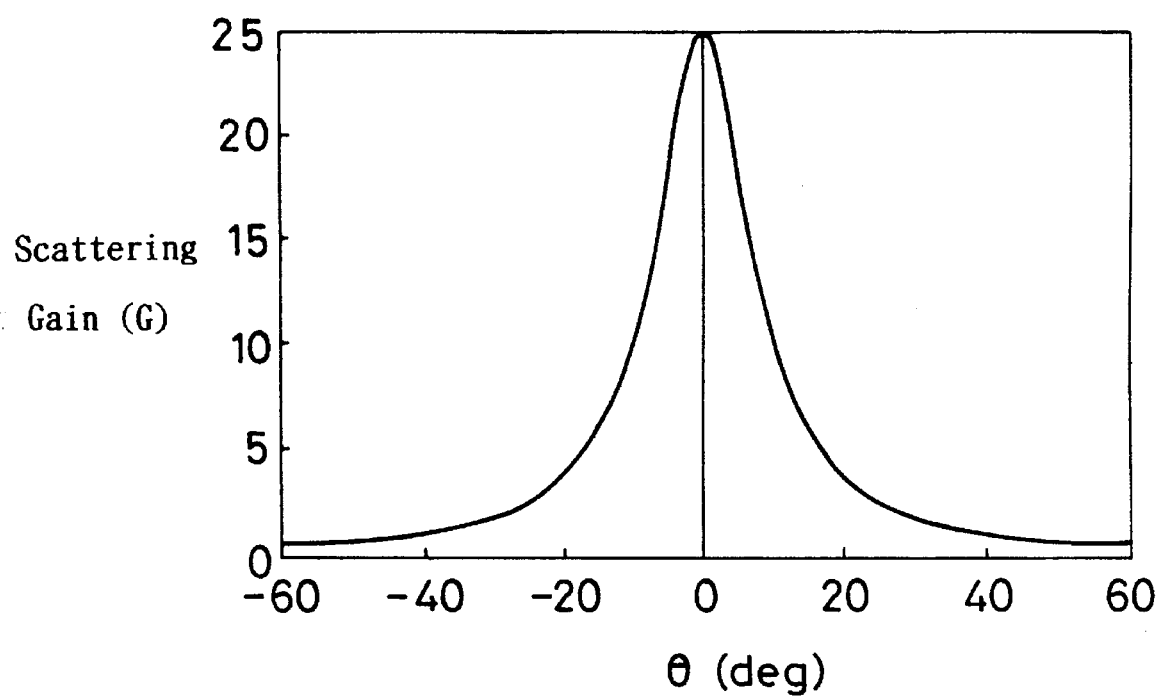
FIG. 3 is a graph showing a light scattering characteristic of the polymer dispersion liquid crystal display panel of the embodiment of FIG. 1.

The curve showing a correlation between output angles (θ) and brightness (B) has the same shape as the curve shown in FIG. 3 even though the values are different from each other. According to FIG. 3, the scatter half angle ($\theta_{1/2}$) of this polymer liquid crystal display panel is 8.2°.

Light source 12 includes a lamp 13 and a concave reflector 14. Light emerging from lamp 13 is converged by concave reflector 14, thus irradiating light from light source 12 with a relatively narrow directivity. The light passes through a field lens 15 and then a liquid crystal panel 11, and enters a projection lens 16. The light is refracted by field lens 15 to transmit within a display region of liquid crystal panel 11 and to enter the projection lens, thus preventing the periphery of images projected on the screen from being dark.

If liquid crystal panel 11 is transparent, the light emerging from the panel is shielded by a shield 17 and does not reach screen 18. As a result, a good black display is shown on the screen, and the contrast ratio of the projected images is also significantly high. The size of shield 17 is determined by the spread angle of the light emerging from the light source. The spread angle of the light is dependent on the length of an emitter (in this example, lamp 13). In comparing emitters having the same level of brightness, the luminous flux of one emitter is smaller and darker than another emitter when the former is shorter than the latter. When a liquid crystal panel, 3.5 inches wide across the corners, and a 5 mm long and 150 W metal halide lamp are used as liquid crystal panel 11 and lamp 13 respectively, the spread angle of the light is 4.3°.

Figure 19:
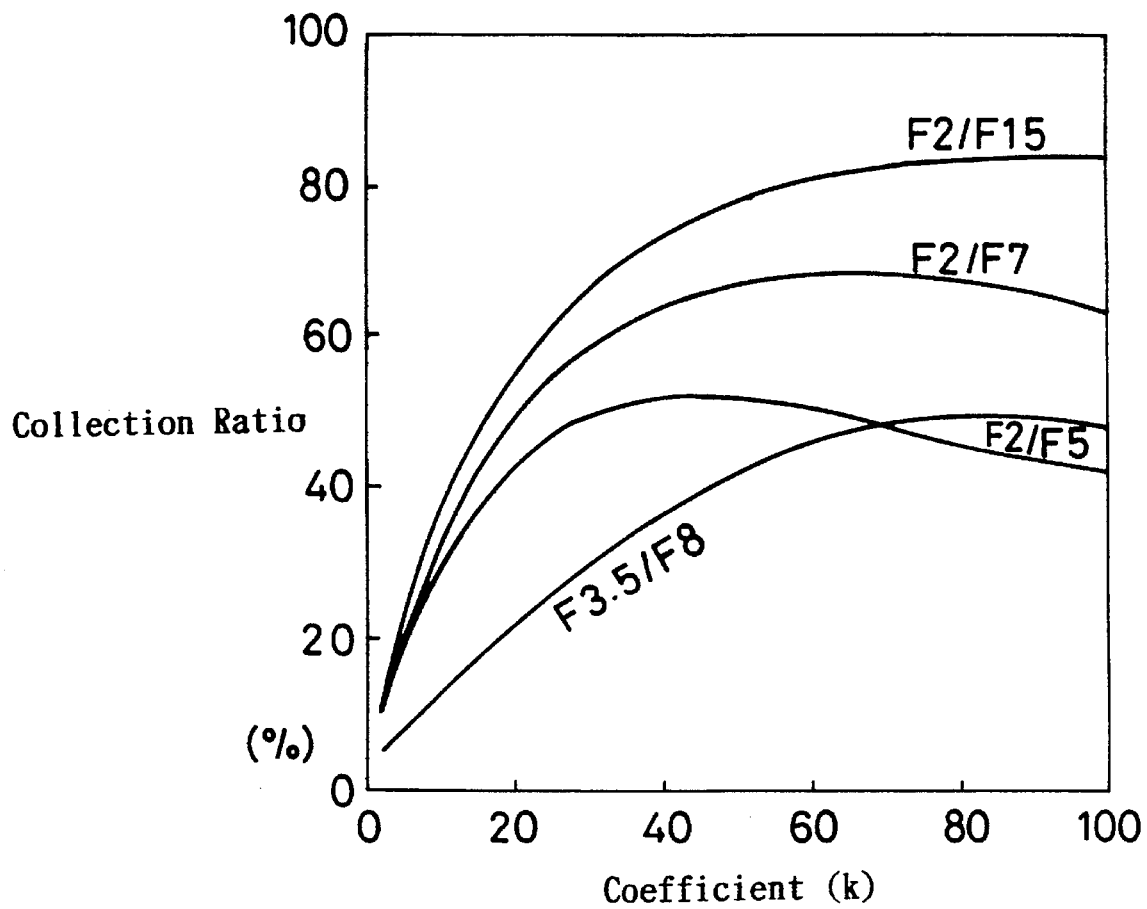
FIG. 19 is another graph showing the correlation between the collection ratios of a light valve projection apparatus and light scattering characteristic of the polymer liquid crystal display panel.
Figure 20A:
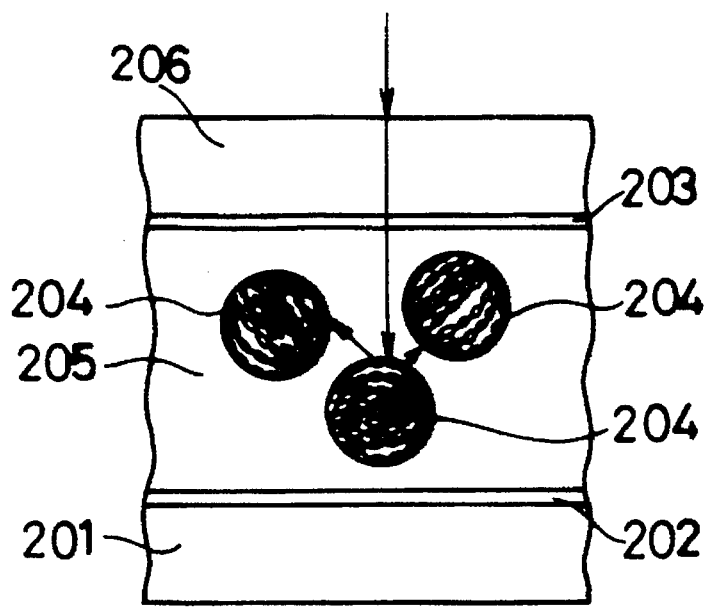
FIG. 20 (a) shows a cross-sectional view of a polymer dispersion liquid crystal display panel when a voltage is not applied to the picture element electrode.
Figure 20B:
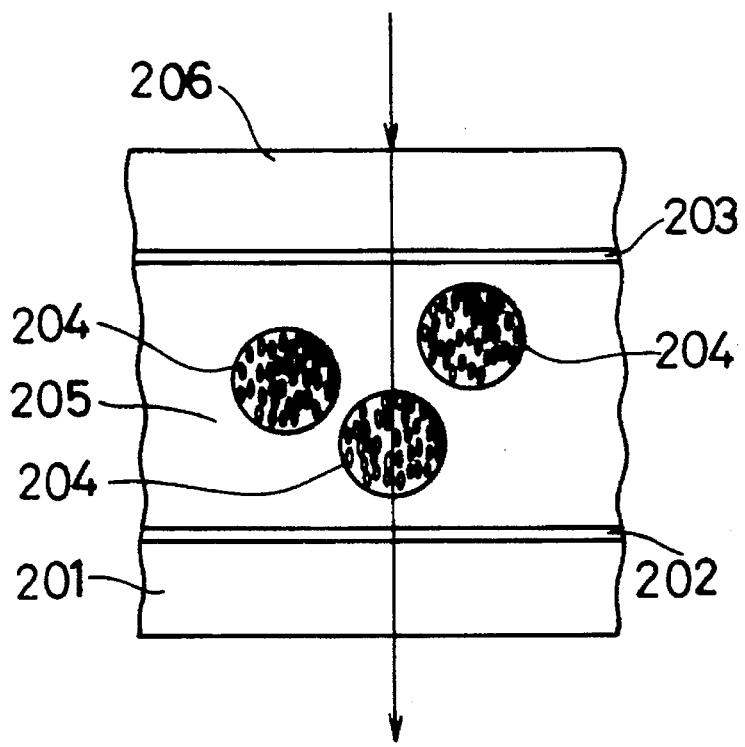
Figure 21:
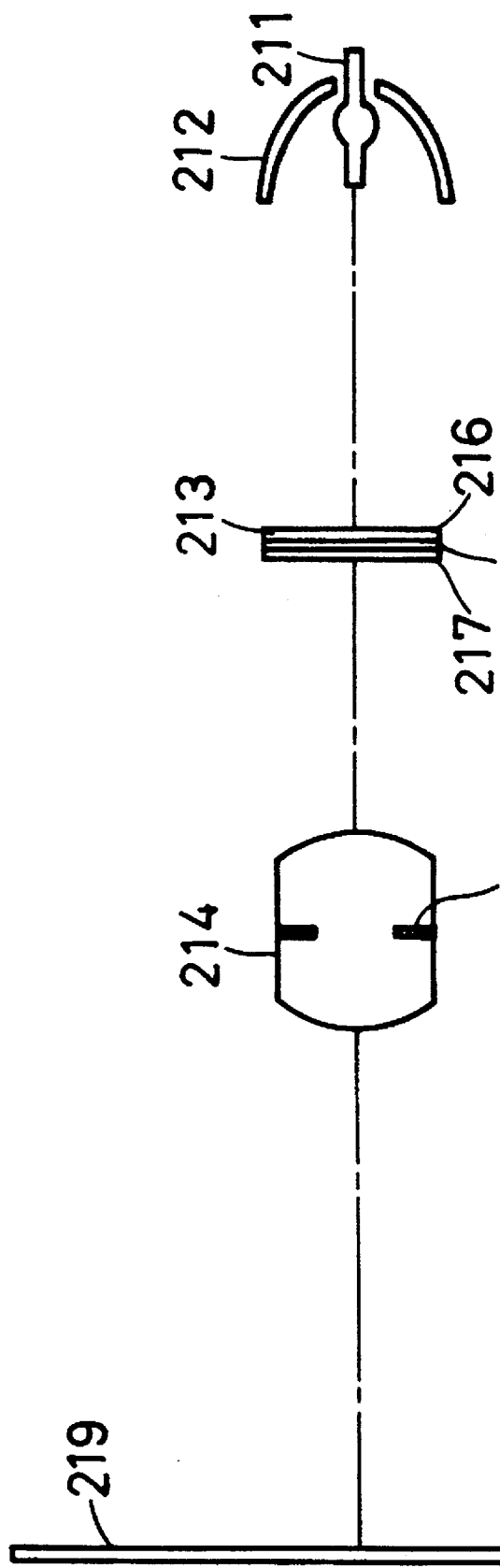
FIG. 21 is a diagram of a conventional light valve apparatus.

When liquid crystal panel 11 is in a light scattering state, the F number of a projection lens 16 is preferably small to collect as much light as possible. When one projection lens is used for one liquid crystal panel as in the projection apparatus of this example, a possible minimum F number of the projection lens is 1.5. If the F number of the projection lens is too small, the diameter of the lens becomes too large to be practical in the invention. Therefore, an F2 projection lens is used in the invention. Scattered light which is within the collection angle of the projection leas and is not shielded by shield 17 reaches screen 18. As shown in FIG. 19, the collection ratio of the projection lens is significantly high at 70%.

As a result of a change in the light scattering state of liquid crystal panel 11, optical images are formed in the liquid crystal panel. The light within the solid angle of light exiting from the liquid crystal display panel enters projection lens 16. A change in light scattering conditions of a liquid crystal display panel results in a change in the quantity of light within the solid angle, thus varying the illuminance on the screen. In other words, when the liquid crystal panel is in a light scattering state with no application of voltage, the illuminance is the smallest; while the liquid crystal panel is in a transparent state with the application of highest voltage, the illuminance is the largest.

Optical images formed in liquid crystal panel 11 are enlarged and projected by way of projection lens 16 onto screen 8. When a color filter is applied to the polymer dispersion liquid crystal display panel of FIG. 2, a color display is produced by the light valve projection apparatus of FIG. 1.

Example 2

Figure 5:
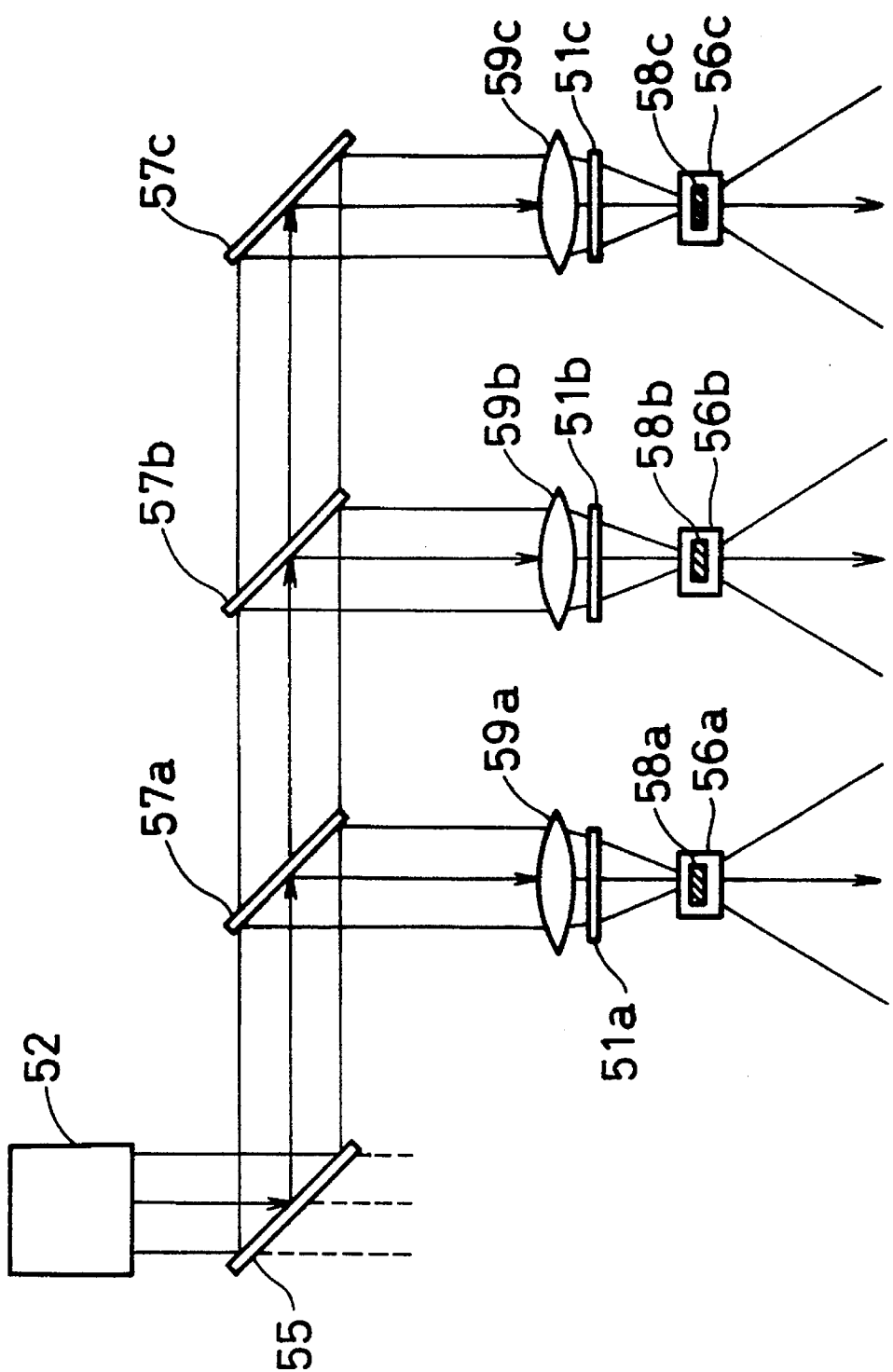
FIG. 5 is a diagram of a light valve projection apparatus of another embodiment of the invention.

The second example of a light valve projection apparatus of the invention is shown in FIG. 5. In FIG. 5, 51a, 51b and 51c are liquid crystal display panels; 52 is a light source; 56a, 56b and 56c are projection lenses; 57a is a blue light reflecting dichroic mirror (BDM); 57b is a green light reflecting dichroic mirror (GDM); 57c is a red light reflecting dichroic mirror (RDM); 58a, 58b and 58c are shields; and 59a, 59b and 59c are field lenses.

Liquid crystal display panels 51a, 51b and 51c are active matrix addressing polymer dispersion liquid crystal display panels, and their structures are the same as in FIG. 2.

Light source 52 includes a lamp and a concave reflector. The lamp is a metal halide lamp, which radiates light having three color components (red, green and blue). The concave reflector is made of glass. A multi-layer film, reflecting visible light and transmitting infrared rays, is deposited on a reflective surface of the concave reflector. Light reflected on the reflective surface radiates from light source 52 as parallel rays.

A multi-layer film, reflecting visible light and transmitting infrared rays as well as ultraviolet rays, is deposited on the surface of a glass substrate, thus preparing a UVIR cut mirror 55.

Infrared and ultraviolet rays of white light emerging from light source 52 are cut by UVIR cut mirror 55, and the blue portion (B portion) of the white light is reflected by BDM 57a. The green portion (G portion) and the red portion (R portion) are reflected by GDM 57b and RDM 57c respectively. As a result, the white light emerging from the light source is split into three color channels (red, green and blue). The B portion, G portion and R portion of the white light transmit through field lenses 59a, 59b and 59c and enter liquid crystal display panels 51a, 51b and 51c respectively. Due to a change in light scattering conditions in the liquid crystal display panels in response to picture signals, optical images are formed in liquid crystal display panels 51a, 51b and 51c. Thence optical images in liquid crystal display panels 51a, 51b and 51c are enlarged and made to overlap each other by projection lenses 56a, 56b and 56c respectively, thus projecting images on a screen. The order of arranging BDM 57a, GDM 57c and RDM 57c is not limited to the arrangement in this example. RDM 57c can also be replaced with a total reflection mirror.

In explaining the operation of the light valve projection apparatus of this example, only the modulation of the B portion of the light is mentioned since the modulations of the R portion, the G portion and the B portion are nearly the same. The B portion of the white light reflected by BDM 57a is focused by field lens 59a, and enters liquid crystal display panel 51a. The light scattering conditions of liquid crystal display panel 51a are controlled by signals applied to the picture element electrodes. The light scattering characteristic of liquid crystal display panel 51a is the same as the liquid crystal display panel used in the first example; the scatter half angle ($\theta_{1/2}$) is 8.2° and the gain (G) is 25. When the liquid crystal display panel is in a transparent state, the blue channel is shielded by a shield 58a, thereby showing a black display on the screen. On the other hand, when the liquid crystal display panel is in a light scattering state, the scattered light of the B portion which was not shielded by shield 58a is enlarged and projected by way of projection lens 56a onto the screen.

Similarly, the G portion and the R portion are modulated by liquid crystal display panels 51b and 51c respectively, and are enlarged and projected by way of projection lenses 56b and 56c onto the screen. The images of the B, G and R portions of the white light thus overlap each other on the screen, producing color images.

The distances between 51a and 56a, 51b and 56b, and 51c and 56c are kept short so that the F numbers of the projection lenses can be small. In this example, the F number of lenses 56a, 56b and 56c is 2. When one projection lens is used for one liquid crystal panel as in the projection apparatus of this example, a realistic minimum F number of the projection lens is 1.5.

Liquid crystal display panels 51a, 51b and 51c are used for the blue portion, the green portion and the red portion of light, respectively, so that images with good brightness and resolution are projected on the screen. However, since the light scattering characteristic of a polymer dispersion liquid crystal display panel depends on the wavelength of light, the red portion is scattered poorly by the panel. Therefore, the thickness of the liquid crystal layer or the diameter of a liquid crystal particle in at least one of liquid crystal display panels 51a, 51b and 51c is preferably differentiated from the others to equalize the scattering conditions of these three color portions of light. For example, in order to equalize the light scattering characteristic of liquid crystal display panel 51c used for the red portion with the scattering characteristic of other liquid crystal display panels in this example, the liquid crystal layer of liquid crystal display panel 51c can be made thicker than the liquid crystal layers of liquid crystal display panels 51a and 51b.

Example 3

Figure 6:
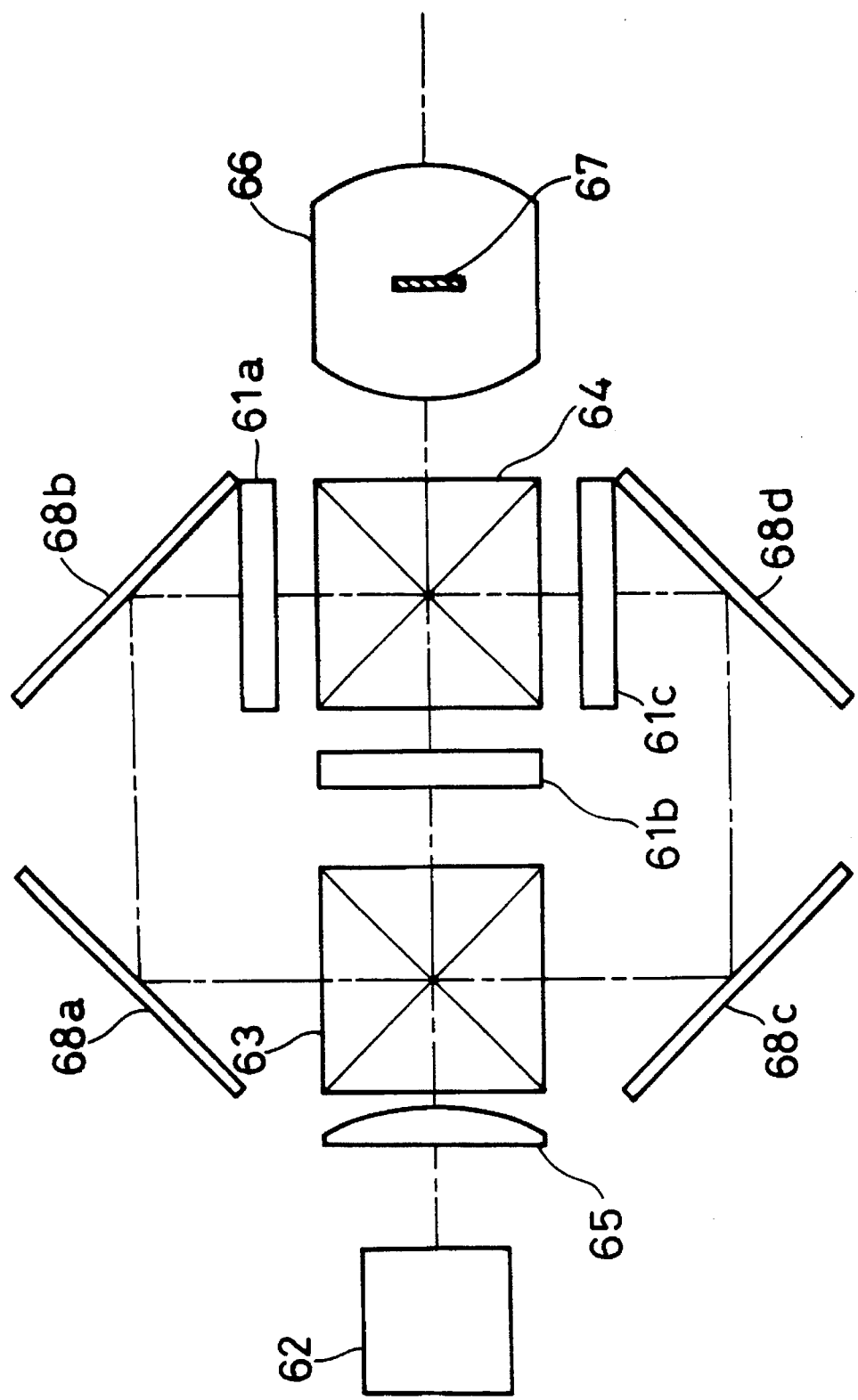
FIG. 6 is a diagram of a light valve projection apparatus of another embodiment of the invention.

The third example of a light valve projection apparatus of the invention is shown in FIG. 6. In FIG. 6, 61a, 61b and 61c are liquid crystal display panels; 62 is a light source; and 66 is a projection lens. Light source 62 is the same as the light source 52 shown in FIG. 5. Numeral 63 is a dichroic prism for splitting light into different color channels; 64 is a dichroic prism for recombining these different color channels; 65 is a lens; 67 is a shield; and 68a, 68b, 68c and 68d are mirrors. Liquid crystal display panels 61a, 61b and 61c are polymer dispersion liquid crystal display panels, and the structures of these panels are the same as the liquid crystal display panel shown in FIG. 2.

White light radiated from light source 62 is split into three color channels (blue, green and red) by dichroic prism 63. These three color channels are reflected by mirrors 68a, 68b, 68c and 68d, or directly enter liquid crystal display panels 61a, 61b and 61c. Optical images are formed by changing the light scattering conditions in liquid crystal display panels 61a, 61b and 61c in response to image signals. These three color channels going out from liquid crystal display panels 61a, 61b and 61c are recombined by dichroic prism 64. The recombined light is projected by way of projection lens 66 onto a screen.

It is preferable that the distances between light source 62 and each liquid crystal display panel (length of a luminous path) are equal to one other. It is also preferable that the distances between projection lens 66 and each liquid crystal display panel are the same. In order to minimize the F number of the projection lens, the distance between projection lens 66 and each liquid crystal display panel are kept as short as possible. A realistic minimum F number of a projection lens used for recombining three color channels is 2; the F number of projection lens 66 of this example, therefore, is 2. In this example, only one projection lens is used not only to recombine three color channels but to project the combined light to the screen.

When a liquid crystal display panel is in a transparent state, radiated light is shielded by shield 67, thus showing a black display on a screen. On the other hand, if the liquid crystal display panel is in a light scattering state, some of the scattered light which was not shielded by shield 67 is projected by way of projection lens 66 to the screen, thereby showing a white display. This description is applicable to all three liquid crystal display panels 61a, 61b and 61c.

By using liquid crystal display panels 61a, 61b and 61c for red, green and blue portions of light respectively, images with good brightness and resolution are projected on the screen in this example. However, since the light scattering characteristic of polymer dispersion liquid crystals is dependent on the wavelength of light, the red portion is scattered poorly by the liquid crystal display panel. Therefore, it is preferable that the thickness of a liquid crystal layer or the diameter of a liquid crystal particle in at least one of liquid crystal display panels 51a, 51b and 51c is differentiated from the others to equalize the light scattering characteristic of these liquid crystal display panels. For example, in order to equalize the scattering characteristic of liquid crystal display panel 61a used for the red portion with the scattering characteristic of other liquid crystal display panels in the invention, the liquid crystal layer of liquid crystal display panel 61a is thicker than the thickness of the liquid crystal layers of liquid crystal display panels 61b and 61c.

Example 4

Figure 7:
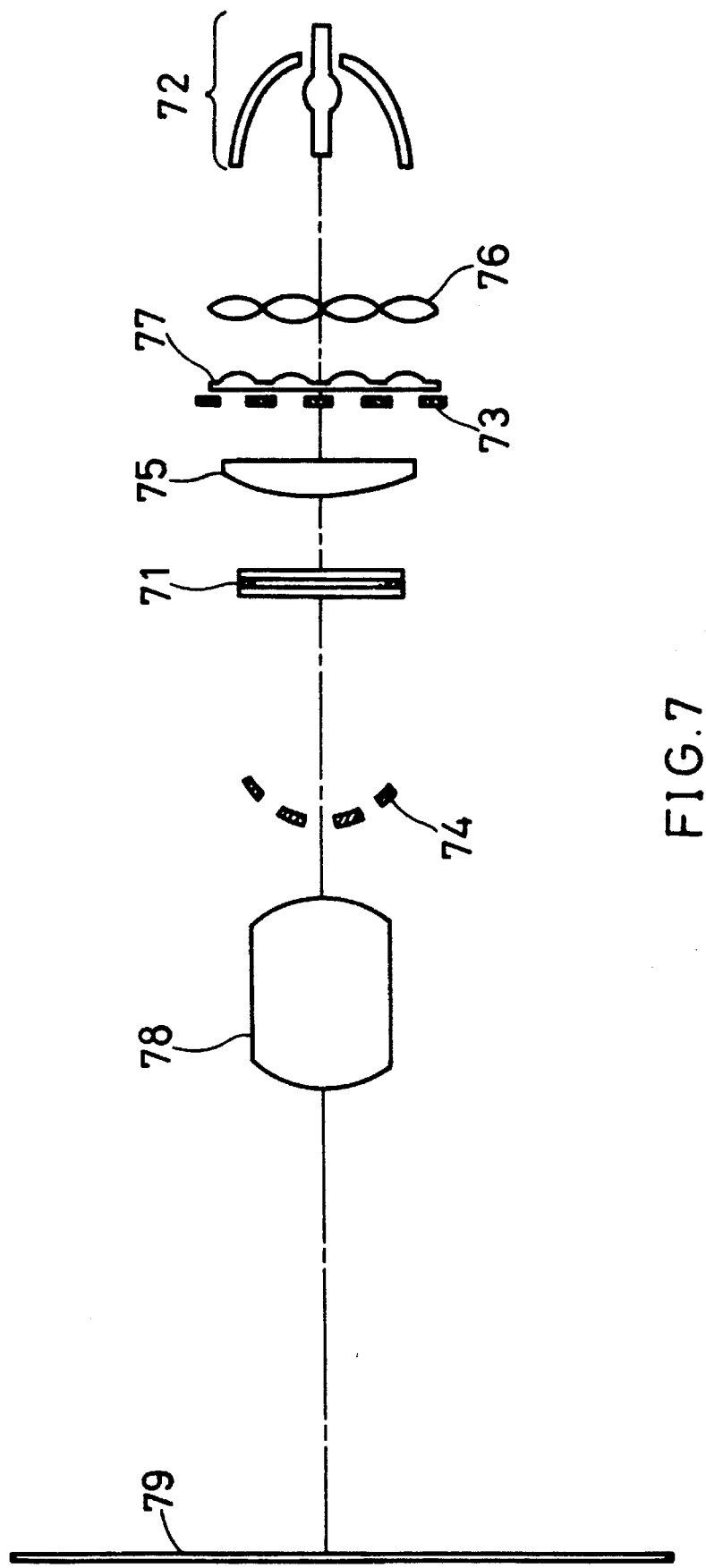
FIG. 7 is a diagram of a light valve projection apparatus of another embodiment of the invention.

The fourth example of a light valve projection apparatus of the invention is shown in FIG. 7. In FIG. 7, 71 is a light valve; 72 is a light source; 73 is an input mask having apertures; 74 is an output mask having apertures; 75 is a schlieren lens; 76 is a fly-eye lens; 77 is a field lens array; and 78 is a projection lens.

An active matrix addressing polymer dispersion liquid crystal display panel having the same structure as the panel shown in FIG. 2 is used as light valve 71 in this example. Schlieren lens 75 is placed between input mask 73 and output mask 74 to project images formed at input mask 73 on output mask 74. Liquid crystal display panel 71 is located between schlieren lens 75 and output mask 74. Even though schlieren lens 75 is placed between output mask 73 and liquid crystal display panel 71 in this example, it is also possible to place it between liquid crystal display panel 71 and output mask 74 instead. In addition, output mask 74 may be located within projection lens 78. Fly-eye lens 76 is located between light source 72 and input mask 73 to form optical images at the apertures of input mask 73. A field lens array 77 is also set near the input mask.

Fly-eye lens 76 is an aggregate of small lenses. Each small lens is facing each aperture of input mask 73. Light emerging from light source 72 and transmitted through one of the small lenses passes through field lens array 77, one aperture of input mask 73, schlieren lens 75, liquid crystal display panel 71 and output mask 74; and the light is then projected by way of the projection lens to a screen. Since this optical path is considered to be one optical system, the F number as well as the contrast of projected images are set high. Moreover, since this optical system is assumed to be one system of aggregated optical systems, the brightness of light is not reduced by input mask 73.

Light emerging from light source 72 enters liquid crystal display panel 71 after passing through input mask 73 and schlieren lens 75. The light is then scattered by liquid crystal display panel 71 which is in a light scattering state; the scattered light passes through the apertures of output mask 74 and is projected by way of projection lens 78 onto screen 79. However, when liquid crystal display panel 71 is in a transparent state, the light is shielded by output mask 74 without reaching screen 79, thus showing a black display on screen 79.

Example 5

Figure 8:
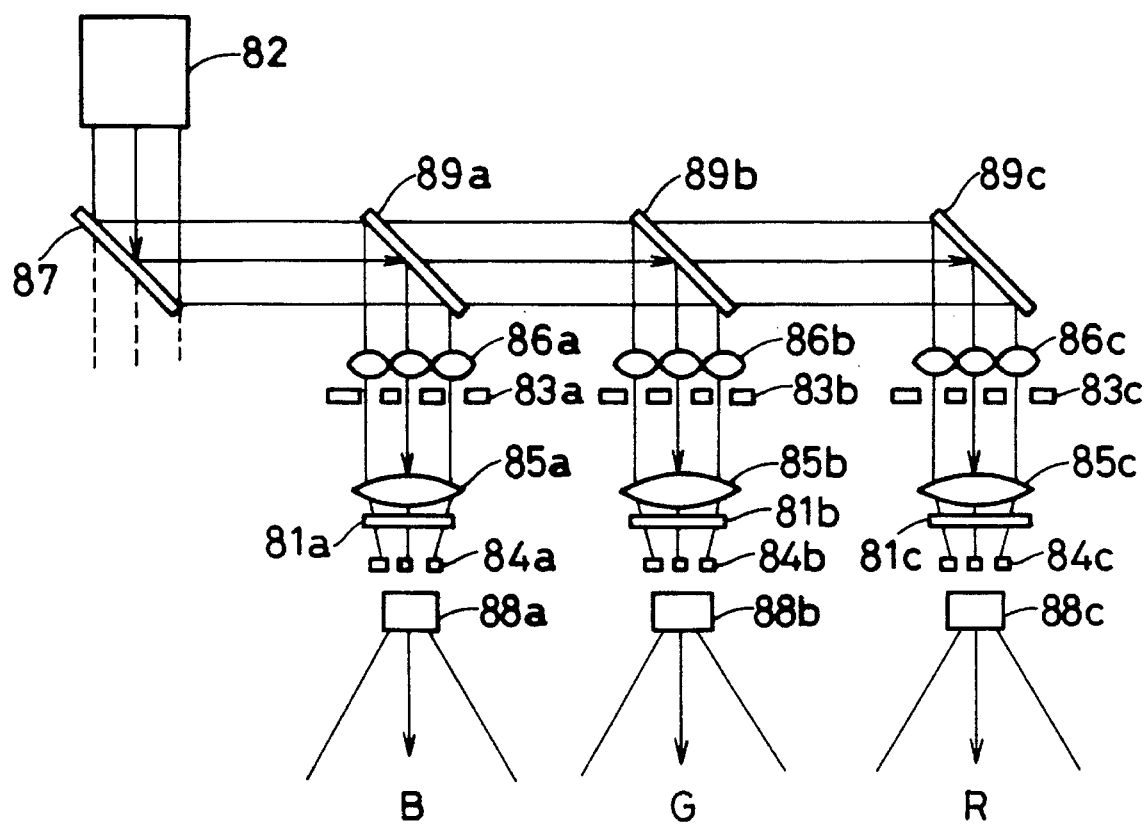
FIG. 8 is a diagram of a light valve projection apparatus of another embodiment of the invention.

The fifth example of a light valve projection apparatus of the invention is shown in FIG. 8. In FIG. 8, 81a, 81b and 81c are liquid crystal display panels; 82 is a light source; 83a, 83b and 83c are input masks; 84a, 84b and 84c are output masks; 85a, 85b and 85c are schlieren lenses; 86a, 86b and 86c are fly-eye lenses; 87 is a UVIR cut mirror; 88a, 88b and 88c are projection lenses; 89a is a BDM; 89b is a GDM; and 89c is a RDM.

Infrared rays and ultraviolet rays of white light emerging from light source 82 are cut by UVIR cut mirror 87. The blue portion (B portion) of the white light is reflected by BDM 89a; the green portion (G portion) of the light transmitted through BDM 89a is reflected by GDM 89b; the red portion (R portion) is then reflected by RDM 89c. The B, G and R portions transmit through fly-eye lenses 86a, 86b and 86c and input masks 83a, 83b and 83c, respectively, and then enter liquid crystal display panels 81a, 81b and 81c respectively. As a result of a change in light scattering conditions in liquid crystal panels 81a, 81b and 81c in response to image signals, optical images are formed in these panels. After passing through output masks 84a, 84b and 84c, these optical images are enlarged and overlap each other by way of projection lenses 88a, 88b and 88c, thus projecting the images onto a screen. The order of arranging BDM 89a, GDM 89b and RDM 89c is not limited to the arrangement in this example. RDM 89c can also be replaced with a total reflection mirror. Fly-eye lenses 86a, 86b and 86c as well as input masks 83a, 83b and 83c can be placed between light source 82 and BDM 89a in one unit. As in FIG. 7, it is also possible to locate field lens arrays next to input masks 83a, 83b and 83c.

In explaining the operation of the light valve projection apparatus of this example, only the modulation of B portion is mentioned since the modulations of the R, G and B portions of the light are nearly the same. After passing through input mask 83a and schlieren lens 85a, the B portion enters liquid crystal display panel 81a. The B portion, scattered by liquid crystal display panel 81a in a light scattering state, passes through the apertures of output mask 84a, and transmits through projection lens 88a. As a result, optical images formed in liquid crystal display panel 81a are enlarged and projected onto a screen. When liquid crystal display panel 81a is in a transparent state, the blue color channel of the light is shielded by output mask 84a without reaching the screen, thereby showing a black display on the screen.

Liquid crystal display panels 81a, 81b and 81c are used for the blue, green and red channels of the light respectively so that images with good brightness and resolution are projected onto the screen. However, since the light scattering characteristic of a polymer dispersion liquid crystal display panel depends on the wavelength of light, the red portion is poorly scattered by the liquid crystal display panel. In order to solve this problem, the thickness of a liquid crystal layer or the diameter of a liquid crystal particle in at least one of liquid crystal display panels 81a, 81b and 81c may be differentiated from each other, thus equalizing the light scattering characteristic of these liquid crystal display panels. For example, in order to equalize the scattering characteristic of liquid crystal panel 81c used for the red portion with the scattering characteristic of other liquid crystal display panels in this example, the liquid crystal layer of liquid crystal display panel 81c can be thicker than the thickness of the liquid crystal layers of liquid crystal display panels 81a and 81b.

Example 6

Figure 9:
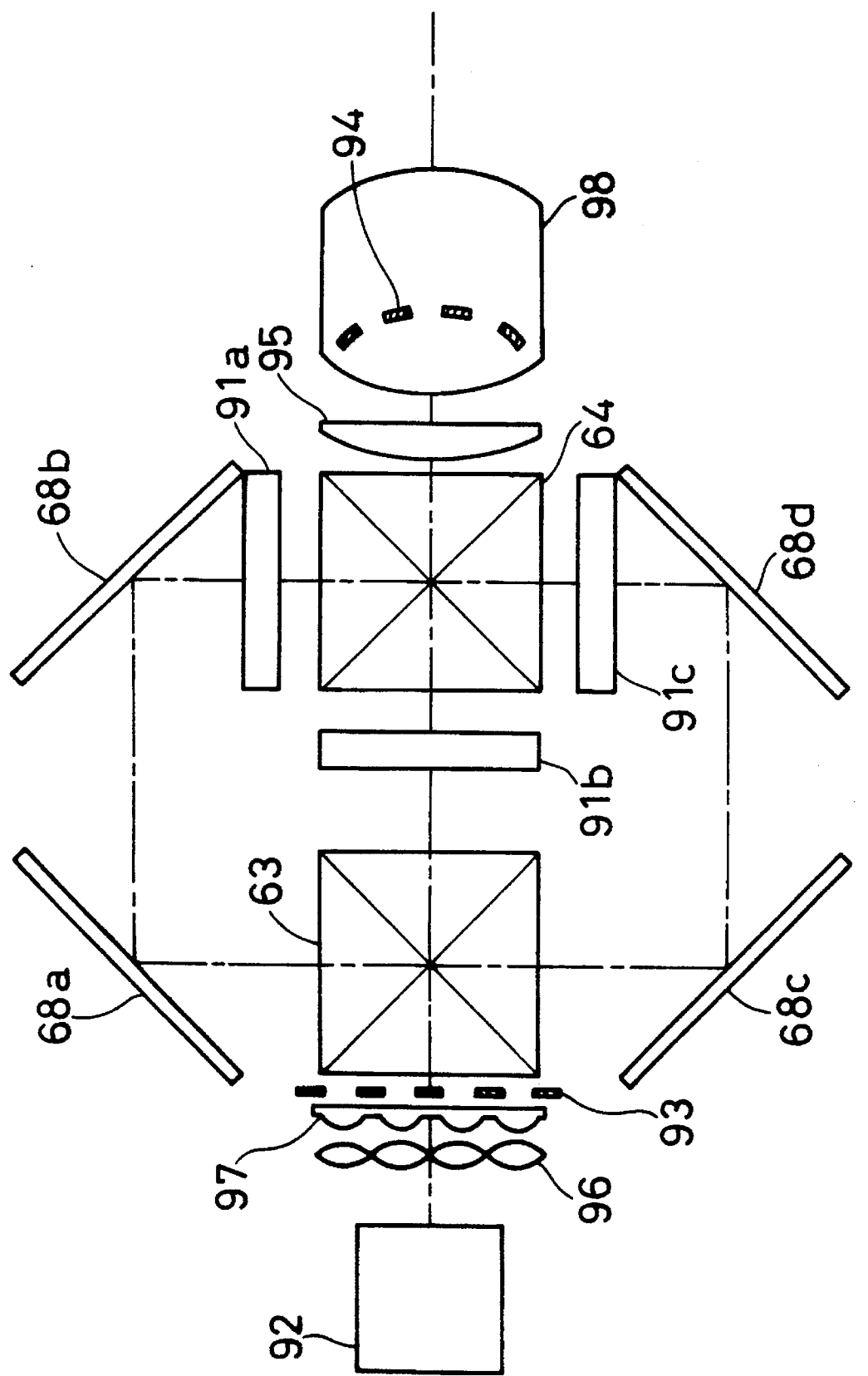
FIG. 9 is a diagram of a light valve projection apparatus of another embodiment of the invention.

The sixth example of a light valve projection apparatus of the invention is shown in FIG. 9. In FIG. 9, 91a, 91b and 91c are liquid crystal display panels; 92 is a light source; 93 is an input mask; 94 is an output mask; 95a, 95b and 95c are schlieren lenses; 96 is a fly-eye lens; 97 is a field lens array; and 98 is a projection lens.

White light emerging from light source 92 is divided into three color channels (blue, green and red) by dichroic prism 63. These blue, green and red channels are reflected by mirrors 68a, 68b, 68c and 68d, or directly enter liquid crystal panels 91a, 91b and 91c respectively. Optical images are formed in liquid crystal display panels 91a, 91b and 91c as a result of a change in light scattering conditions in response to image signals. Three color channels, transmitted through liquid crystal display panels 91a, 91b and 91c, are recombined with each other by dichroic prism 64, and then enter projection lens 98. As a result, images formed in the liquid crystal display panels are enlarged and projected onto the screen.

Since the modulations of the red, green and blue channels are nearly the same, only the modulation of the blue channel is explained. The blue channel enters liquid crystal display panel 91a via input mask 93, and is scattered by liquid crystal display panel 91a in a light scattering state. The scattered light then passes through the apertures of output mask 94 and projection lens 98, thus reaching the screen. As a result, images formed in the liquid crystal display panel are enlarged and projected on the screen. When liquid crystal display panel 91a is in a transparent state, the light is shielded by output mask 94 before reaching the screen. Thus, a black display is projected onto the screen.

Example 7

Figure 10:
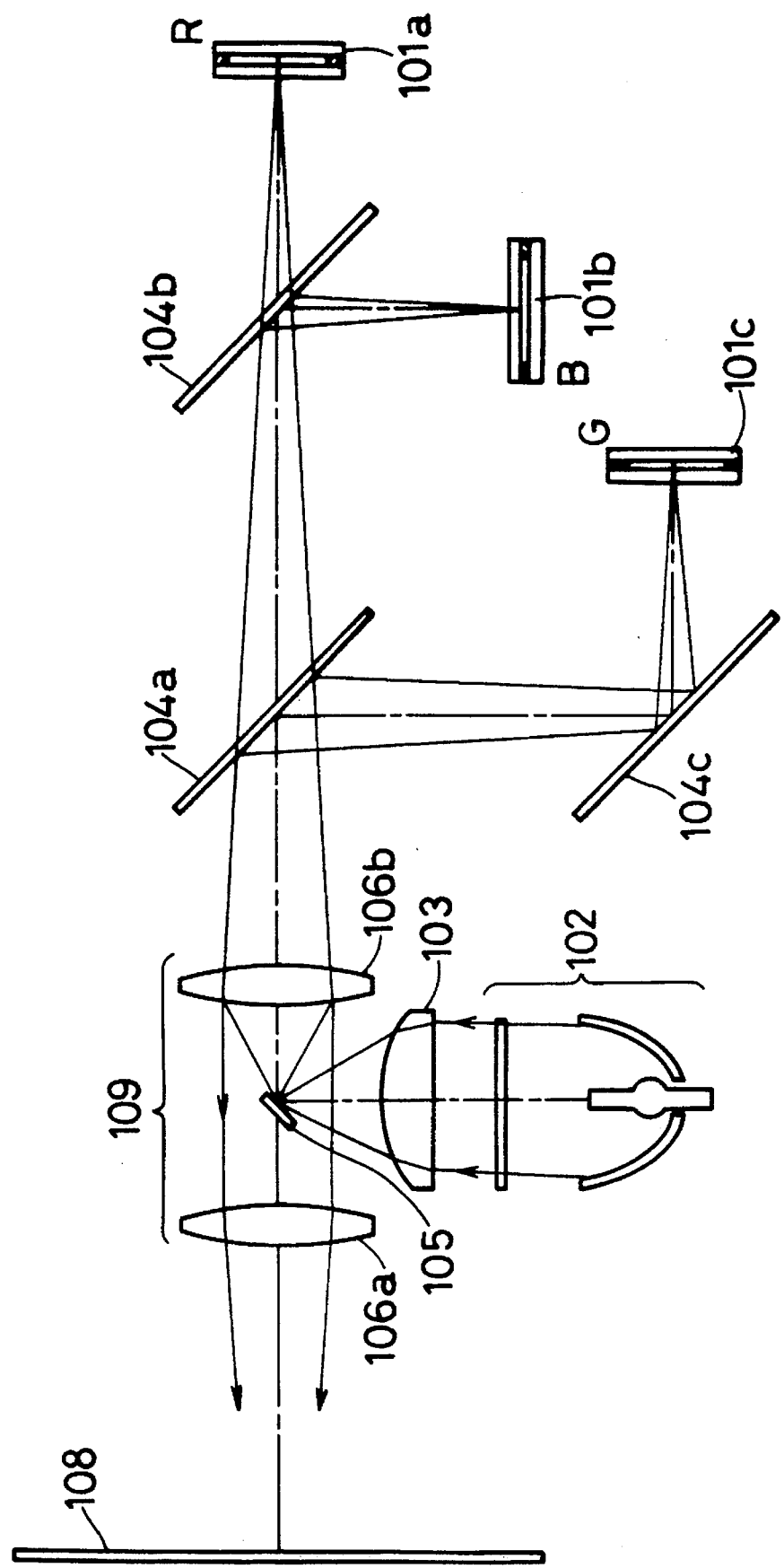
FIG. 10 is a diagram of a light valve projection apparatus of another embodiment of the invention.

The seventh example of a light valve projection apparatus of the invention is shown in FIG. 10. Although the liquid crystal display panels in Examples 1–6 are all transparent, the liquid crystal display panels in this example are not limited to these transparent panels. By using a reflective electrode made of aluminum or the like as either the counter electrode or the picture element electrode, a reflective liquid crystal display panel is prepared in this example.

In FIG. 10, 102 is a light source comprising a lamp, a concave reflector and a UVIR cut filter; 104a and 104c are GDMs; and 104b is a BDM. The order of arranging GDMs 104a, 104b and 104c is not limited to the arrangement shown in FIG. 10. Instead of GDM, a total reflection mirror may be used for 104c. Reflective polymer dispersion liquid crystal display panels are used for 101a, 101b and 101c. Lenses are 103, 106a and 106b; 105 is a mirror. Lenses 106a and 106b consist of a projection optical system 109; a mirror 105 is located at the pupil of projection optical system 109. Numeral 108 is a screen.

Since the modulations of red, green and blue channels of light are nearly the same, only the modulation of the blue channel is explaned. White light radiates from light source 102, and is focused on mirror 105 by a converging lens 103. The light is then reflected by mirror 105, and split into three different color channels by the dichroic mirrors. The blue channel is reflected on BDM 104b. and enters liquid crystal display panel 101b. One of the counter electrode 25 and the picture element electrode 26 as shown in FIG. 2 of liquid crystal display panel 101b is a reflective electrode made of Al or the like. By the application of signals to picture element electrode 26, the light scattering conditions of the liquid crystal display panel are determined, thus modulating the blue channel. When liquid crystal display panel 101b is in a transparent state, the blue channel reflected on the liquid crystal display panel is shielded by mirror 105 at the pupil of projection optical system 106. On the other hand, when the blue channel is reflected on liquid crystal display panel 101b in a light scattering state, the reflected channel passes through the pupil of projection optical system 106 and reaches a screen 108. As a result, images formed in the liquid crystal display panel are enlarged and projected onto the screen.

Similarly, images of the red and green channels formed in liquid crystal panels 101a and 101c are enlarged and projected onto screen 108. The dichroic mirrors used for splitting the white light into these three color channels are also used for recombining these channels in this example. Thus, the images formed in the liquid crystal display panels are recombined by the dichroic mirror to display overlapping images on the screen.

Example 8

Figure 15:
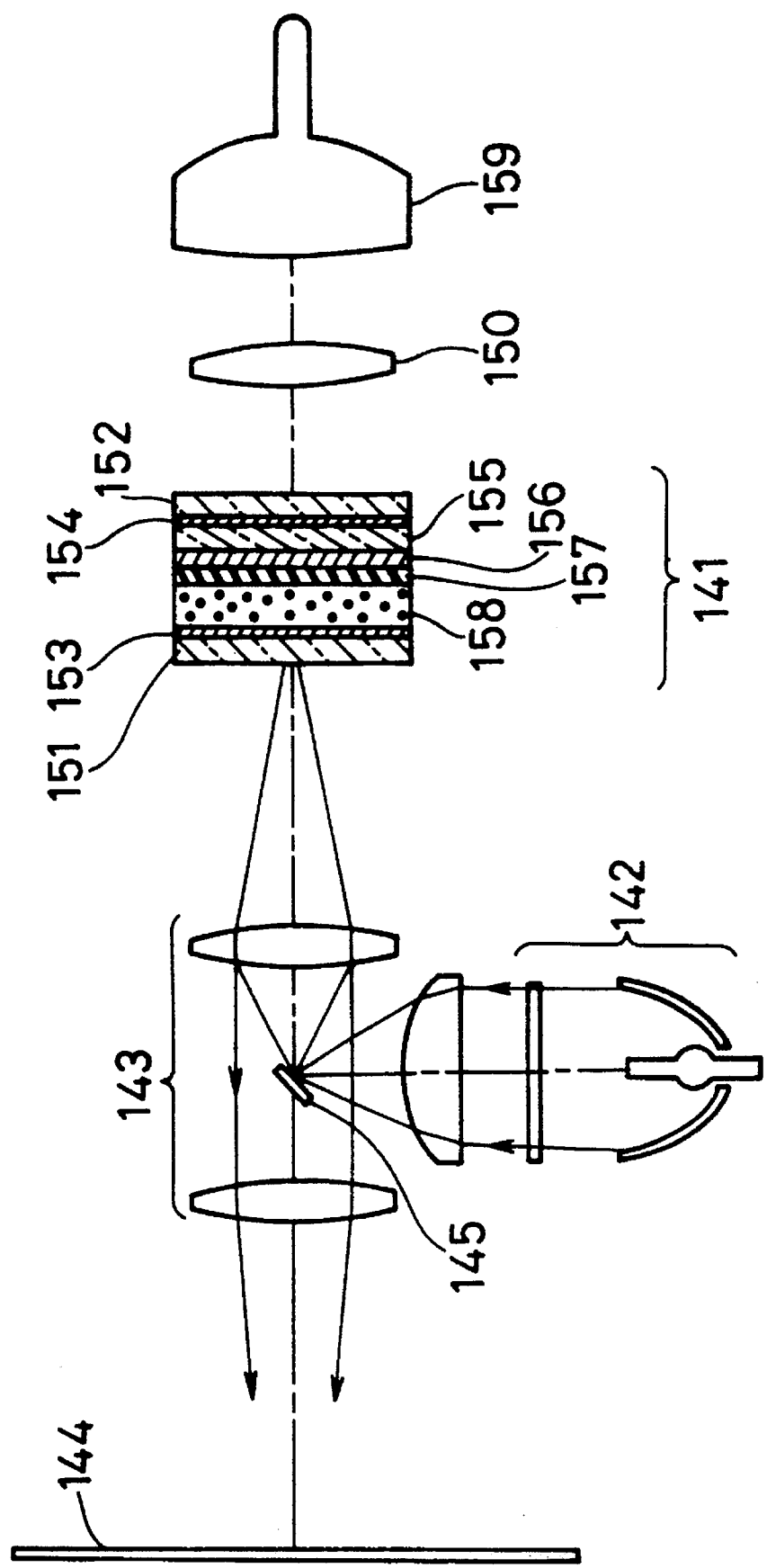
FIG. 15 is a diagram of a light valve projection apparatus of another embodiment of the invention.

FIG. 15 is a diagram of a light beam writing type light valve projection apparatus of the eighth embodiment of the invention. In FIG. 15, 151 and 152 indicate transparent glass substrates, and transparent electrodes 153 and 154 are formed on the surfaces of the glass substrates. A photoconductive layer 155, a shielding layer 156, a dielectric mirror 157, and a polymer dispersion liquid crystal layer 158 are formed between electrode 153 and electrode 154. Photoconductive layer 155 functions as a voltage transformer, controlling voltage which is applied to polymer dispersion liquid crystal layer 158 by arranging the intensity of writing light beam outgoing from a writing means such as CRT (Cathode Ray Tube) 159 or the like. If there is no writing light beam, the impedance is high enough that voltage is not applied to polymer dispersion liquid crystal layer 158. In response to the intensity of the writing light beam, the impedance lowers so that voltage is applied to the liquid crystal layer. Shielding layer 156 shields writing light beam leaking from dielectric mirror 157 in order to prevent the beam from reaching photoconductive layer 155, Dielectric mirror 157 reflects the writing light beam and shields the beam from the light beam writing system.

Images provided by the light beam writing means such as CRT 159 enter a liquid crystal display panel 141 after transmitting through a lens 150; on the other hand, light radiated from a metalhalide lamp 142 or a xenon lamp enters the readout side of liquid crystal panel 141. The images are then converted as a result of a change in flight scattering conditions of polymer dispersion liquid crystal layer 158, and finally projected on a screen 144 by way of a projection lens 143.

Example 9

Figure 16:
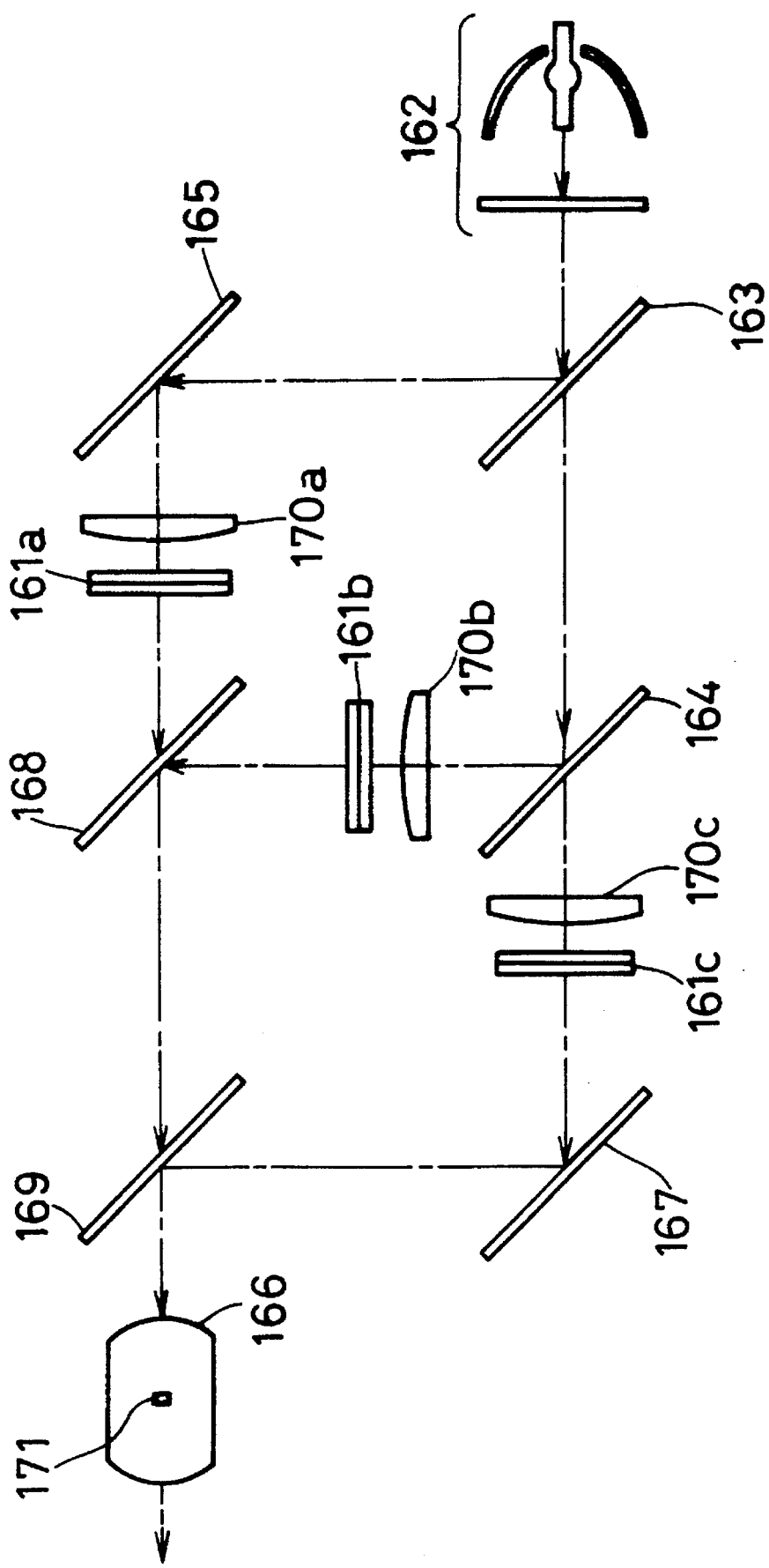
FIG. 16 is a diagram of a light valve projection apparatus of another embodiment of the invention.

The ninth example of a light valve projection apparatus of the invention is shown in FIG. 16. In FIG. 16, 161a, 161b and 161c are liquid crystal display panels; 162 is a light source; 166 is a projection lens; 163 and 164 are dichroic mirrors to split white light emerging from light source 162 into three color channels such as blue, green and red; 165 and 167 are reflection mirrors; 168 and 169 are dichroic mirrors to recombine the three color channels; 170a, 170b and 170c are lenses; and 171 is a shield. Liquid crystal display panels 161a, 161b and 161c are polymer dispersion liquid crystal display panels. The structure of these panels is the same as the liquid crystal display panel shown in FIG. 2.

The blue, green and red channels enters liquid crystal display panels 161a, 161b and 161c, respectively, and optical images are formed in each liquid crystal display panel as a result of changes in light scattering conditions of the panel in response to image signals. After these three color channels emerging from liquid crystal display panels 161a, 161b and 161c are recombined by dichroic mirrors 168 and 169, the recombined light is enlarged and projected by way of a projection lens 166 onto a projection screen.

The distances between light source 162 and each of liquid crystal display panels 161a, 161b and 161c as well as the distances between projection lens 166 and each of these panels can be set to be equal. The F number of projection lens 166 is 3.5. The coefficient (k) according to Formula (2) of the liquid crystal display panels 161a, 161b and 161c is 80. In other words, with a 7° scatter half angle and a 3.6° spread angle of the light source, these liquid crystal display panels can achieve collection ratios higher than 50%.

When a liquid crystal display panel is in a transparent state, a color channel enters projection lens 166 without being scattered by the panel. The entitle color channel is then shielded by shield 171, thus showing a black display on the screen. Some light of the color channel, which was scattered by the liquid crystal display panel in a light scattering state, is not shielded by shield 171 and transmits through projection lens 166, thus showing a white display on the screen. This explanation is applicable to liquid crystal display panels 161a, 161b and 161c.

Since each of these liquid crystal display panels 161a, 161b and 161c is used for each one of these red, green and blue channels respectively, a projection image with excellent brightness and resolution is obtained in this example.

As in FIGS. 7, 8 and 9, a mask, a fly-eye lens and a schlieren lens may be used in the projection apparatus of this example.

The invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, and all changes which come within the meaning and range of equivalency of the claims are intended to be embraced therein.

We claim:

1. A light valve projection apparatus comprising:

a light source;

a light valve for forming optical images in response to a change in light scattering conditions in said light valve of light irradiated from said light source;

projection means for projecting said optical images onto a screen; and a shield for shielding said optical images formed at or near a pupil of said projection means;

said light valve having a $\Theta_{1/2}$ less than 23° where $\Theta_{1/2}$ represents a scatter half angle at which a brightness of light exiting from said light valve when said light valve is in a light scattering state in a direction tilted by $\Theta$ degrees with respect to a normal direction of said light valve is half as bright as light exiting in the normal direction of said light valve.

2. The light valve projection apparatus according to claim 1, wherein the light source is arranged to provide light having a spread angle of less than 9°.

3. The light valve projection apparatus according to claim 1, wherein the light valve comprises a polymer dispersion liquid crystal display panel having a liquid crystal layer in which liquid crystals are dispersed in a matrix polymer.

4. A light valve projection apparatus comprising:

a light source;

a plurality of light valves for forming optical images in response to a change in light scattering conditions in said plurality of light valves of light irradiated from said light source;

projection means for combining and projecting said optical images onto a screen; and a shield for shielding said optical images formed at or near a pupil of said projection means;

said light valves having a $\Theta_{1/2}$ less than 17° where $\Theta_{1/2}$ represents a scatter half angle at which a brightness of light exiting from said light valves when said light valves are in a light scattering state in a direction tilted by $\Theta$ degrees with respect to a normal direction of said plurality of light valves are half as bright as light exiting in the normal direction of said plurality of light valves.

5. The light valve project, ion apparatus according to claim 4, wherein the light source is arranged to provide light having a spread angle of less than 6°.

6. The light valve projection apparatus according to claim 4, further comprising optical color separation means for splitting the light emerging from the light source into blue, green and red color channels, and wherein the plurality of light valves are placed to receive at least one of said blue, green and red color channels.

7. The light valve projection apparatus according to claim 6, wherein said optical color separation means comprises dichroic prisms.

8. The light valve projection apparatus according to claim 4, wherein each of said plurality of light valves comprises a polymer dispersion liquid crystal display panel having a liquid crystal layer in which liquid crystals are dispersed in a matrix polymer.

9. The light valve projection apparatus according to claim 8, wherein the liquid crystal layer in at least one polymer dispersion liquid crystal display panel has a thickness different from the liquid crystal layers in other polymer dispersion liquid crystal display panels.

10. The light valve projection apparatus according to claim 8, wherein the liquid crystals contained in at least one polymer dispersion liquid crystal display panel have an average particle diameter different from the liquid crystals in other polymer dispersion liquid crystal display panels.

11. A light valve projection apparatus, comprising:

a light source;

a light valve for forming optical images in response to a change in light scattering conditions in said light valve of light irradiated from said light source;

projection means for projecting said optical images onto a screen;

first shielding means located between said light source and said light valve, said first shielding means having apertures;

second shielding means located between said light valve and said projection means; and a focusing lens located between said first shielding means and said second shielding means;

wherein images at said first shielding means are projected on said second shielding means by way of said focusing lens; and wherein said second shielding means shields images projected on the apertures of said first mask;

said light valve having a $\Theta_{1/2}$ less than 23° where $\Theta_{1/2}$ represents a scatter half angle at which brightness of light exiting from said light valve when said light valve is in a light scattering state in a direction tilted by $\Theta$ degrees with respect to a normal direction of said light valve is half as bright as light exiting in the normal direction of said light valve.

12. The light valve projection apparatus according to claim 11, further comprising a first lens array formed by a plurality of lens located between the light source and the first shielding means and a second lens array for focusing images of the first lens array on the light valve, said second lens array being located close to said first shielding means.

13. The light valve projection apparatus according to claim 11, wherein the light valve comprises a polymer dispersion liquid crystal display panel having a liquid crystal layer in which liquid crystals are dispersed in a matrix polymer.

14. A light valve projection apparatus comprising:

a light source;

a plurality of light valves for forming optical images in response to a change in light scattering conditions in said plurality of light valves of light irradiated from said light source;

projection means for combining and projecting said optical images onto a screen;

first shielding means located between said light source and said plurality of light valves, said first shielding means having apertures;

second shielding means located between said light valves and said projection means; and a focusing lens located between said first shielding means and said second shielding means;

wherein images at said first shielding means are projected onto said second shielding means by way of said focusing lens; and wherein said second shielding means shields images projected on the apertures of said first shielding means;

each of said plurality of light valves having a $\Theta_{1/2}$ less than 17° where $\Theta_{1/2}$ represents a scatter half angle at which brightness of light exiting from said light valves when said light valves are in a light scattering state in a direction tilted by $\Theta$ degrees with respect to a normal direction of said light valves is half as bright as light exiting in the normal direction of said light valves.

15. The light valve projection apparatus according to claim 14, further comprising a first lens array formed by a plurality of lens located between the light source and the first shielding means and a field lens array located close to said first shielding means.

16. The light valve projection apparatus according to claim 14, further comprising optical color separation means for splitting the light emerging from the light source into blue, green and red color channels, and wherein the light valves are positioned to receive at least one of said blue, green and red color channels.

17. The light valve projection apparatus according to claim 16, wherein the optical color separation means comprises dichroic prisms.

18. The light valve projection apparatus according to claim 14, wherein each of said plurality of light valves comprises a polymer dispersion liquid crystal display panel having a liquid crystal layer in which liquid crystals are dispersed in a matrix polymer.

19. The light valve projection apparatus according to claim 18, wherein the liquid crystal layer in at least one polymer dispersion liquid crystal display panel has a thickness different from the liquid crystal layers in other polymer dispersion liquid crystal display panels.

20. The light valve projection apparatus according to claim 18, wherein the liquid crystals contained in at least one polymer dispersion liquid crystal display panel have an average particle diameter different from the liquid crystals in other polymer dispersion liquid crystal display panels.

21. A light valve projection apparatus comprising:

a light source;

a light valve for forming optical images in response to a change in light scattering conditions in said light valve of light irradiated from said light source;

projection means for projecting said optical images onto a screen;

first shielding means located between said light source and said light valve and having a plurality of openings;

a first lens array formed by a plurality of lenses and arranged to focus an image of said light source on said openings of said first shielding means;

a second lens array disposed in the vicinity of said first shielding means and arranged to focus an image of said first lens array on said light valve; and second shielding means having a plurality of openings substantially corresponding to said plurality of openings of said first shielding means.

22. The light valve projection apparatus according to claim 21, further comprising a focusing lens disposed between said first shielding means and said second shielding means, and wherein said image of said first shielding means is focused on said second shielding means by said focusing lens.

23. The light valve projection apparatus according to claim 21, wherein said second shielding means is disposed in the vicinity of a pupil of said projection means.

24. A light valve projection apparatus comprising:

a light source;

a polymer dispersion liquid crystal panel serving as a light valve for forming optical images in response to a change in light scattering conditions in said light valve of light irradiated from said light source;

projection means for projecting said optical images onto a screen;

first shielding means located between said light source and said light valve, said first shielding means having a plurality of openings;

a first lens array formed by a plurality of lenses and focusing an image of said light source on said openings of said first shielding means;

a second lens array disposed in the vicinity of said first shielding means and focusing an image of said first lens array on said light valve; and second shielding means having a plurality of openings substantially corresponding to said plurality of openings of said first shielding means;

said light valve having a $\Theta_{1/2}$ less than 23° where $\Theta_{1/2}$ represents a scatter half angle at which brightness of light exiting from said light valve when said light valve is in a light scattering state in a direction tilted by $\Theta$ degrees with respect to a normal direction of said light valve is half as bright as light exiting in the normal direction of said light valve.

25. A light valve projection apparatus comprising:

a light source;

optical color separation means for splitting the light emerging from said light source into a plurality of wavebands;

a plurality of light valves each placed to receive light in one of said wavebands and to form optical images in response to a change in light scattering conditions in said light valve;

optical color mixing means for mixing the optical images formed by said light valves;

projection means for projecting said mixed optical images onto a screen;

first shielding means located between said light source and said light valves, said first shielding means having a plurality of openings;

a first lens array formed by a plurality of lenses to focus an image of said light source on said openings of said first shielding means;

a second lens array disposed in the vicinity of said first shielding means and focusing an image of said first lens array on said light valves; and second shielding means having a plurality of openings substantially corresponding to said plurality of openings of said first shielding means.

* * * * *